(12) United States Patent
Wu

(10) Patent No.: US 10,921,540 B2
(45) Date of Patent: Feb. 16, 2021

(54) OPTICAL FIBER FAN-OUT ASSEMBLY WITH RIBBONIZED INTERFACE FOR MASS FUSION SPLICING, AND FABRICATION METHOD

(71) Applicant: CORNING INCORPORATED, Corning, NY (US)

(72) Inventor: Qi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/555,157

(22) Filed: Aug. 29, 2019

(65) Prior Publication Data

US 2020/0081218 A1 Mar. 12, 2020

Related U.S. Application Data

(60) Provisional application No. 62/728,317, filed on Sep. 7, 2018.

(51) Int. Cl.
*G02B 6/44* (2006.01)
*G02B 6/02* (2006.01)
(Continued)

(52) U.S. Cl.
CPC ....... *G02B 6/4471* (2013.01); *G02B 6/02395* (2013.01); *G02B 6/255* (2013.01); *G02B 6/4239* (2013.01)

(58) Field of Classification Search
CPC .................. G02B 6/4471; G02B 6/02395; G02B 6/4239; G02B 6/255; G02B 6/368
See application file for complete search history.

(56) References Cited

U.S. PATENT DOCUMENTS

| 4,077,702 A | 3/1978 | Kunze et al. |
| 4,254,865 A | 3/1981 | Pacey et al. |

(Continued)

FOREIGN PATENT DOCUMENTS

| CN | 1548492 A | 11/2004 |
| CN | 202494801 U | 10/2012 |

(Continued)

OTHER PUBLICATIONS

International Search Report and Written Opinion of the International Searching Authority; PCT/US2019/047507; dated Nov. 15, 2019; 17 Pages; European Patent Office.

(Continued)

*Primary Examiner* — Ryan A Lepisto
(74) *Attorney, Agent, or Firm* — Kapil U. Banakar

(57) ABSTRACT

An optical fiber fan-out assembly includes multiple optical fibers arranged in a one-dimensional array in a transition segment in which spacing between fibers is varied from a first pitch (e.g., a buffered fiber diameter of 900 μm) to a second pitch (e.g., a coated fiber diameter of 250 μm). A polymeric material encapsulates the optical fibers in the transition segment, and the assembly further includes multiple optical fiber legs each terminated with a fiber optic connector. Optical fibers extending beyond a boundary of the polymeric material are subject to being mass fusion spliced to another group of multiple optical fibers, and the fusion splices encapsulated with polymeric material, to form a fiber optic cable assembly. Methods for fabricating multi-fiber assemblies providing fan-out functionality are further provided, and the need for furcation tubes is avoided.

25 Claims, 12 Drawing Sheets

(51) Int. Cl.
*G02B 6/42* (2006.01)
*G02B 6/255* (2006.01)

(56) References Cited

U.S. PATENT DOCUMENTS

| | | | |
|---|---|---|---|
| 4,509,820 A | 4/1985 | Murata et al. | |
| 4,537,468 A | 8/1985 | Degoix et al. | |
| 4,714,316 A | 12/1987 | Moore et al. | |
| 4,778,242 A | 10/1988 | Ota et al. | |
| 4,812,010 A | 3/1989 | Osaka et al. | |
| 4,865,411 A | 9/1989 | Darsey et al. | |
| 4,923,274 A | 5/1990 | Dean | |
| 5,022,735 A | 6/1991 | Dahlgren | |
| 5,212,756 A | 5/1993 | Eoll | |
| 5,231,688 A | 7/1993 | Zimmer | |
| 5,247,598 A | 9/1993 | Takimoto et al. | |
| 5,367,591 A | 11/1994 | Seike et al. | |
| 5,416,873 A | 5/1995 | Huebscher et al. | |
| 5,731,051 A | 3/1998 | Fahey et al. | |
| 5,832,162 A | 11/1998 | Sarbell | |
| 6,099,170 A | 8/2000 | Sarbell | |
| 6,152,611 A | 11/2000 | Mardirossian | |
| 6,295,400 B1 * | 9/2001 | Shahid | G02B 6/368 385/114 |
| 6,367,990 B1 | 4/2002 | Dumitriu | |
| 6,421,493 B1 | 7/2002 | Burek et al. | |
| 6,454,471 B1 | 9/2002 | Ware et al. | |
| 6,485,199 B1 | 11/2002 | Ware et al. | |
| 6,614,971 B2 * | 9/2003 | Sun | G02B 6/368 385/114 |
| 6,676,299 B1 | 1/2004 | Durrant et al. | |
| 6,738,555 B1 | 5/2004 | Cooke et al. | |
| 6,771,961 B2 | 8/2004 | Bamburak et al. | |
| 7,461,981 B2 | 12/2008 | Yow, Jr. et al. | |
| 8,047,726 B2 | 11/2011 | Tamekuni et al. | |
| 8,408,811 B2 | 4/2013 | de Jong et al. | |
| 8,408,818 B2 | 4/2013 | Homma | |
| 8,573,855 B2 | 11/2013 | Nhep | |
| 8,696,221 B2 | 4/2014 | Vastmans et al. | |
| 8,740,479 B2 | 6/2014 | Shitama et al. | |
| 8,824,841 B1 | 9/2014 | Mullen | |
| 8,915,659 B2 | 12/2014 | Marcouiller et al. | |
| 9,089,931 B1 | 7/2015 | Carberry et al. | |
| 9,167,626 B1 | 10/2015 | Wu | |
| 9,360,624 B2 | 6/2016 | Faulkner et al. | |
| 9,604,261 B2 | 3/2017 | Wu | |
| 9,939,599 B2 | 4/2018 | Blazer et al. | |
| 10,018,782 B2 | 7/2018 | Wu | |
| 10,209,447 B2 | 2/2019 | Filipowicz et al. | |
| 10,353,154 B2 | 7/2019 | Ott et al. | |
| 2003/0103743 A1 | 6/2003 | Sun et al. | |
| 2004/0062480 A1 | 4/2004 | Cronk et al. | |
| 2005/0271338 A1 | 12/2005 | Livingston | |
| 2006/0093281 A1 | 5/2006 | Kesler | |
| 2012/0243838 A1 | 9/2012 | Sato et al. | |
| 2012/0281951 A1 | 11/2012 | Takahashi et al. | |
| 2014/0321813 A1 | 10/2014 | Lu | |
| 2016/0349453 A1 | 12/2016 | Wu | |
| 2017/0001224 A1 | 1/2017 | Wu | |
| 2017/0031121 A1 | 2/2017 | blazer et al. | |
| 2018/0011262 A1 | 1/2018 | Chabot et al. | |
| 2018/0024294 A1 | 1/2018 | Wang et al. | |

FOREIGN PATENT DOCUMENTS

| | | |
|---|---|---|
| DE | 202007013173 U1 | 1/2008 |
| EP | 0057828 A1 | 1/1982 |
| EP | 1168018 A2 | 1/2002 |
| JP | 55103513 A | 8/1980 |
| JP | 55129305 A | 10/1980 |
| JP | 58147707 A | 9/1983 |
| JP | 59037515 A | 3/1984 |
| JP | 52015504 A | 1/1987 |
| JP | 11326677 A | 11/1999 |
| JP | 2001147340 A | 5/2001 |
| JP | 2004347801 A | 12/2004 |
| JP | 2005250294 A | 9/2005 |
| JP | 2009163165 A | 7/2009 |
| JP | 2011232375 A | 11/2011 |
| JP | 05233859 B2 | 7/2013 |
| WO | 2009040271 A2 | 4/2009 |
| WO | 2011112764 A1 | 9/2011 |
| WO | 2013007969 A2 | 1/2013 |
| WO | 2018175122 A1 | 9/2018 |

OTHER PUBLICATIONS

Duke et al; "Benefits of CO2 Laser Heating for High Reliability Fiber Splicing," Proc. SPIE 9735, pp. B1-B12, 2016.

Friebele et al; "Method for Recoating Optical Fibres With Polyimide," Electron. Lett, 34, pp. 1249-1250, 1998.

Glaesemann et al; "The Mechanical Reliability of Corning Optical Fiber in Small Bend Scenarios" ; Corning; ISO 9001 Registered; (2007) 8 Pages.

Matsumoto et al; "Design and Characteristics of Reinforcement Method for Fusion Spliced Optical Fiber," J. Lightwave Technol., LT-3, pp. 322-327, 1985.

Serafini.; "Compact and Reliable Protection of Single-Fiber and Ribbon-Fiber Fusion Splices" Proc. SPIE 1973, pp. 306-315 1993.

Trunk et al; "Protection With Heat-Shrinkable Sleeves for Optical Fiber Arc Fusion Splicing," Proc. SPIE 1365, Components for Fiber Optic Applications V, pp. 124-130, 1990.

Volotinen et al; "Effect of Mechanical Stripping and Arc-Fusion on the Strength and Aging of a Spliced Recoated Optical Fiber," Mat. Res. Soc. Symp. Proc. 531, pp. 163-168, 1998.

Wood, "Reliability of Optical Connectors and Splices, " Proc. SPIE 2074, pp. 276-287, 1994.

Wu; "Fiber Optic Cable Assembly With Thermoplastically Overcoated Fusion Splice" Filed As U.S. Appl. No. 62/592,564 on Nov. 30, 2017; 78 Pages.

Wu; "Method and Apparatus for Protecting Fusion Spliced Optical Fibers With Thermoplastic Material" Filed As U.S. Appl. No. 62/592,578 on Nov. 30, 2017; 81 Pages.

Yablon, A.D.; "Optical Fiber Fusion Splicing," Springer, 2005; pp. 161-180.

Yamada et al; "Arc Usion Splicer With Profile Alignment System for High-Strength Low-Loss Optical Submarine Cable," J. Lightwave Technol., LT-4, pp. 1204-1210, 1986.

* cited by examiner

OPTICAL FIBER FAN-OUT ASSEMBLY WITH RIBBONIZED INTERFACE FOR MASS FUSION SPLICING, AND FABRICATION METHOD

PRIORITY APPLICATION

This application claims the benefit of priority of U.S. Provisional Application No. 62/728,317, filed on Sep. 7, 2018, the content of which is relied upon and incorporated herein by reference in its entirety.

BACKGROUND

The disclosure relates generally to ribbon-type fiber optic cable assemblies, and more particularly to ribbon-type optical fiber fan-out assemblies as well as cable assemblies incorporating such fan-out assemblies, in addition to methods for fabricating ribbon-type optical fiber fan-out assemblies and associated cable assemblies incorporating the same with protected fusion splices.

Optical fibers are useful in a wide variety of applications, including the telecommunications industry for voice, video, and data transmission. In a telecommunications system that uses optical fibers, there are typically many locations where fiber optic cables, which carry the optical fibers, connect to equipment or other fiber optic cables. Fiber optic cables are frequently produced by extruding thermoplastic material (e.g., polyvinylchloride (PVC)) over at least one coated optical fiber.

FIG. 1 is a cross-sectional view of an exemplary coated optical fiber 10 that includes a glass core 12, glass cladding 14 surrounding the glass core 12, and a multi-layer polymer coating 20 (including an inner primary coating layer 16 and an outer secondary coating layer 18) surrounding the glass cladding 14. The inner primary coating layer 16 may be configured to act as a shock absorber to minimize attenuation caused by any micro-bending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 μm, about 250 μm, about 250 μm or less, or any other suitable value. Optionally, an ink layer (e.g., having a thickness of about 5 μm) may be arranged over the outer secondary coating layer 18 of the coated optical fiber 10 to color the fiber (e.g., as is commonly used in ribbonized fibers), or a coloring agent may be mixed with the coating material that forms the outer secondary coating layer 18. Optionally, an additional buffer (not shown) may be arranged over the coated optical fiber 10 to provide additional protection and allow for easier handling, effectively forming a cable. The buffer may be embodied in a layer of different material applied to the coating 20, thereby forming a "tight buffer" closely surrounding (intimately contacting and conforming to) the coating 20. Alternatively, the buffer may be embodied in a pre-formed tube (also known as a furcation tube or buffer tube) that has an inner diameter larger than the coating 20 and into which the coated optical fiber 10 is inserted, thereby forming a "loose buffer." This additional buffer typically has an outer diameter of about 900 μm.

In this disclosure, the term "optical fiber" (or "fiber") will be used in a generic sense and may encompass bare optical fibers, coated optical fibers, or buffered optical fibers, as well as optical fibers including different sections corresponding to these fiber types, unless it is clear from the context which of the types is intended. "Bare optical fibers" (including "bare glass optical fibers") or "bare sections" are those with no coating present on the fiber cladding. "Coated optical fibers" or "coated sections" include a single or multi-layer coating (typically an acrylic material) surrounding the fiber cladding and have a nominal (i.e., stated) diameter no greater than twice the nominal diameter of the bare optical fiber. "Buffered optical fibers" or "buffered sections" are coated optical fibers with an additional buffer that increases the nominal diameter of the optical fiber to more than twice the nominal diameter of the bare optical fiber, with 900 μm being the most typical nominal diameter. Buffered optical fibers may also be referred to as "buffered cables." As noted above, the buffer may be embodied in a layer of material applied to the coated optical fiber so as to be in intimate contact with the coating and form a "tight buffered optical fiber" (also referred to as "tight buffered cable"), or in a loose-fitting tube that receives the coated optical fiber to form a "loose tube" or "loose buffered" optical fiber (also referred to as "loose tube cable" or "loose buffered cable"). A gap exists between at least a portion of the outer surface of the coated fiber and an inner surface of the loose-fitting tube, with such gap optically being filled with a gel, powder, or some other material that facilitates insertion of the coated optical fiber. Finally, the term "unbuffered optical fibers" refers to optical fibers without a buffer, and therefore may encompass either bare optical fibers or coated optical fibers.

Groups of coated optical fibers (e.g., at least 4, 8, 12, or 24 optical fibers) may be held together using a matrix material, intermittent inter-fiber binders ("spiderwebs"), or tape to form "optical fiber ribbons" or "ribbonized optical fibers" to facilitate packaging within cables, with each fiber having a different color for ease of identification. For example, ribbonized optical fibers are widely used in cables for high capacity transmission systems. Some modern cables in large-scale data center or fiber-to-the-home networks may contain up to 3,456 optical fibers, and cables having even higher optical fiber counts are under development. Buffered fibers can also be ribbonized over short lengths by removing the buffer and holding the fibers at an appropriate pitch using the matrix material. The purpose of such ribbonization is to facilitate termination using mass fusion splicing or multi-fiber connectors.

In many network locations, such as data centers and fiber distribution hubs, each fiber in a ribbon may need to be terminated by a fiber optic connector for interfacing with a transceiver or other equipment. Conventionally, a device known as a ribbon fan-out kit (RFK) enables the transition from an optical fiber ribbon or cable to individual fibers, which are frequently inserted into furcation tubing (e.g., having a 900 μm diameter) for ease of handling. In addition to furcation tubes, a RFK typically provides a housing to receive the optical fiber ribbon, as well as a cavity for bare fibers or coated fibers separated from the ribbon to spread from a small pitch (typically 0.25 mm) into a much larger pitch required by the presence of the furcation tubes into which the individual fibers have been respectively inserted.

A conventional RFK is disclosed in U.S. Pat. No. 7,461, 981 assigned to Corning Optical Communications LLC. An exploded (i.e., unassembled) perspective view of an RFK embodiment of such patent is reproduced in the accompanying FIG. 2. The RFK 30 includes a lower furcation body 32, an upper furcation body 34, a heat shrink 36, an insert block 38, and an ultraviolet (UV) indicator 40 that is sensitive to UV light. The RFK 30 receives an optical fiber ribbon 42 adjacent a first end 44 of the RFK 30 and separates optical fibers of the optical fiber ribbon 42 into individual optical fibers 48 each encased within respective furcation tubes 50 (e.g., typically having an outer diameter of 900 μm) adjacent a second end 46 of the RFK 30. The upper and lower furcation bodies 34, 32 may be molded of a rigid plastic or composite material and may define lower and upper ribbon guides 52, 54 for supporting and guiding the optical fiber ribbon 42 into a lead-in area 56. The lower furcation body 32 includes a medially arranged funnel area 58 defined between angled walls 60 for smoothly transitioning individual optical fibers 48 of the multi-fiber optical ribbon 42 from the heat shrink 36 to the insert block 38 without introducing appreciable attenuation due to bending of the optical fibers 42. The heat shrink 36 is a heat shrinkable tube that has been mechanically expanded to provide a wide passage 62 enabling the heat shrink 36 to slide over the optical fiber ribbon 42 in a loose-fit configuration. After heating to shrink the heat shrink 36 around the optical fiber ribbon 42, the heat shrink 36 promotes mechanical retention of the optical fiber ribbon 42 in the lead-in area 56. The insert block 38 defines passageways 64 through which the individual optical fibers 48 are threaded into the furcation tubes 50. Flexible locking latches 66 of the lower furcation body 32 are configured to be received by recesses 68 in the upper furcation body 34 for securement of the two furcation bodies 32, 34. A fill port 70 in the upper furcation body 34 may be used to receive an epoxy or acrylate and deliver such substance to the funnel area 58 to prevent movement of the optical fibers 48 therein. Through holes 72 defined in the upper and lower furcation bodies 34, 32 permit the RFK 30 to be mechanically secured to an optical device or optical hardware using twist ties or cable ties (not shown). The furcation tubes 50 and the optical fibers 48 therein may be terminated with suitable single-fiber or multi-fiber connectors (not shown) to form furcated connector pigtails.

Direct termination of individual furcated fibers spreading outward from a ribbon with single-fiber connectors can be a cumbersome process. Optical fibers must be individually routed through separate furcation tubes, which is particularly time-consuming. The friction of a furcation tube limits the length of a furcated connector pigtail. Low friction furcation tubes are made of polytetrafluoroethylene (PTFE), which is a costly material and can represent a significant fraction of the cost of a cable assembly. After optical fibers are routed through furcation tubes, connectors are then attached (often manually) to distal ends of the individual optical fibers and furcation tubes to form the furcated pigtails.

As an alternative to forming furcated connector pigtails, separate connector pigtails can be pre-fabricated and thereafter fusion spliced with individual fibers from an optical fiber ribbon, and the resulting group of fusion spliced regions may be protected in a housing similar to that employed in a RFK. FIG. 3 illustrates an exemplary cable assembly 80 utilizing such a housing 82, with one end of the cable assembly 80 including a multi-fiber push-on (MPO) connector 84 affixed to a multi-fiber cable 86 (incorporating a ribbon therein). The multi-fiber cable 86 enters one side of the housing 82, and multiple (e.g., twelve) connector pigtails 88 enter the other side of the housing 82. Each connector pigtail 88 includes one or more optical fibers 90 terminated with a separate connector 92. An advantage of using single fiber splicing compared to the direct furcation process is that furcation tubes may be omitted, thereby saving material and labor costs. Loose tube furcation and termination is also prone to micro bend loss at extreme temperature environments. Furthermore, the processes of terminating and testing connectors on complex cable assemblies are more challenging than comparable processes applicable to simple jumpers or pigtails. The small amount of insertion loss introduced by fusion splicing is more than offset by improved environmental performance and higher connector quality inherent to pre-fabricated connector pigtails.

As can be appreciated, the term "connector pigtail" is used in this disclosure in a generic sense to refer to an optical fiber terminated with a fiber optic connector. The optical fiber may be a bare fiber, coated fiber, or buffered fiber (loose or tight buffered), although the latter two typically include a bare fiber section (e.g., formed by removing coating(s)) on each end. One end includes a bare fiber section for connectorization/connectivity purposes, while the other end includes a bare fiber section to facilitate fusion splicing.

Optical fiber fusion splicing is the process by which a permanent, low-loss, high-strength, fused (or welded) joint is formed between two optical fibers. The ultimate goal of optical fiber fusion splicing is to create a joint with no optical loss, yet with mechanical strength and long-term reliability that matches an unspliced continuous fiber. An exemplary fusion splice subassembly 94 for protecting a splice joint 96 formed between bare sections 14A, 14B of two coated optical fibers 10A, 10B is schematically illustrated in FIG. 4. After a coating is stripped to expose glass cladding and form the bare sections 14A, 14B, flat fiber end faces are formed, typically by cleaving the exposed glass portions of the fibers. Then the bare sections 14A, 14B are laterally aligned to each other, and the fiber tips are heated to their softening point while being pressed together, resulting in formation of a welded splice joint 96. Checks such as loss estimation and proof testing (to ensure long term mechanical reliability) may be performed. The completed splice must also be protected from the environment. Packaging 98 for the splice joint 96 and the bare sections 14A, 14B may include a heat shrink protection sleeve or a multi-part housing (optionally containing epoxy or another encapsulating material). If the packaging 98 is provided in the form of a heat shrink protection sleeve (e.g., including an outer heat shrink member and an inner thermoplastic melt flow adhesive tube), then the heat shrink protection sleeve may include a strength member such as a stainless steel rod to serve as a splint to prevent bending of the splice joint.

While single-fiber fusion splicing is considerably simpler than a loose tube furcation process, splicing fibers one at a time is still a time-consuming process that requires fiber management during and after splicing. The resulting fiber splices are typically packaged in a RFK-style housing. An alternative to single fiber splicing is to use fusion splice-on connectors or mechanical splice connectors on the ends of furcated fibers. The splice point in a splice-on connector is protected inside one of the connector components, thus eliminating the need for a separate housing to manage multiple splice joints. Whether in the context of connector pigtails or splice-on connectors, however, splicing fibers one at a time is very time-consuming, which limits scalability and concomitantly increases labor and tool utilization.

In view of the foregoing, need exists in the art for improved ribbon-type optical fiber fan-out assemblies and fiber optic cable assemblies incorporating such fan-out assemblies, as well as methods for producing the same, to address limitations associated with conventional assemblies and fabrication methods.

SUMMARY

Aspects of the present disclosure provide an optical fiber fan-out assembly with a polymeric material encapsulating a plurality of optical fibers arranged in a one-dimensional array in a variable fiber pitch transition segment, a fiber optic cable assembly incorporating such a fan-out assembly, and a method for fabricating a multi-fiber assembly providing fan-out functionality. In exemplary aspects, a variable pitch transition segment (also referred to simply as "transition segment") arranged between a larger pitch first segment and a smaller pitch second segment is encapsulated with polymeric material. A plurality of optical fiber legs terminated with fiber optic connectors extend from an end of the first segment, and in the second segment a plurality of optical fibers extend beyond a boundary of the polymeric material. The polymeric encapsulating material may be flexible and low-profile in character, may conform to a shape of the transition segment, and dispenses with the need for a housing or other strength member. Optical fibers extending beyond a boundary of the polymeric material are subject to being mass fusion spliced to another group of multiple optical fibers, and the fusion splices encapsulated with polymeric material, to form a fiber optic cable assembly. Additional exemplary aspects relate to methods for fabricating multi-fiber assemblies providing fan-out functionality.

In one embodiment of the disclosure, an optical fiber fan-out assembly is provided. The optical fiber fan-out assembly comprises a plurality of optical fibers arranged in a one-dimensional array extending through a first segment, a second segment, and a transition segment disposed between the first and second segments. The optical fiber fan-out assembly further comprises a plurality of optical fiber legs extending from the one-dimensional array at an end of the first segment. Each optical fiber leg of the plurality of optical fiber legs includes at least one optical fiber of the plurality of optical fibers, and a fiber optic connector that terminates the at least one optical fiber of the optical fiber leg. The optical fiber fan-out assembly further comprises a polymeric material encapsulating the plurality of optical fibers in the transition segment. In the first segment, the one-dimensional array comprises a first pitch between centers of adjacent optical fibers of the plurality of optical fibers. In the second segment, the one-dimensional array comprises a second pitch between centers of adjacent optical fibers of the plurality of optical fibers. In the transition segment, the one-dimensional array transitions from the first pitch proximate the first segment to the second pitch proximate the second segment. In at least a portion of the second segment that is distal from the transition segment, the plurality of optical fibers extends beyond a boundary of the polymeric material.

In accordance with another embodiment of the disclosure, a fiber optic cable assembly is provided. The fiber optic cable assembly comprises a first plurality of optical fibers arranged in a one-dimensional array extending through a first segment, a second segment, and a transition segment disposed between the first and second segments. Each optical fiber of the first plurality of optical fibers includes a first bare glass section along an end of the second segment that is distal from the transition segment. The fiber optic cable assembly further comprises a plurality of optical fiber legs extending from the one-dimensional array at an end of the first segment, wherein each optical fiber leg of the plurality of optical fiber legs includes at least one optical fiber of the first plurality of optical fibers, and a fiber optic connector that terminates the at least one optical fiber of the optical fiber leg. The fiber optic cable assembly further comprises a first polymeric material encapsulating the first plurality of optical fibers in the transition segment. In the first segment, the one-dimensional array comprises a first pitch between centers of adjacent optical fibers of the plurality of optical fibers. In the second segment, the one-dimensional array comprises a second pitch between centers of adjacent optical fibers of the plurality of optical fibers. In the transition segment, the one-dimensional array transitions from the first pitch proximate the first segment to the second pitch proximate the second segment. In at least a portion of the second segment, the plurality of optical fibers extends beyond a boundary of the polymeric material. The fiber optic cable assembly further comprises a second plurality of optical fibers arranged in a one-dimensional array, wherein each optical fiber of the second plurality of optical fibers includes a second bare glass section. The fiber optic cable assembly further comprises a plurality of fusion splices connecting ends of the first bare glass sections to ends of the second bare glass sections. The fiber optic cable assembly further comprises a second polymeric material encapsulating the plurality of fusion splices, the first bare glass sections, and the second bare glass sections.

In accordance with another embodiment of the disclosure, a method for fabricating a multi-fiber assembly providing fan-out functionality is provided. The method comprises arranging a first segment of a first plurality of optical fibers in a one-dimensional array having a first pitch between centers of adjacent optical fibers of the first plurality of optical fibers. A plurality of optical fiber legs extend from the one-dimensional array at an end of the first segment, each optical fiber leg of the plurality of optical fiber legs includes at least one optical fiber of the first plurality of optical fibers, and a fiber optic connector that terminates the at least one optical fiber of the optical fiber leg. The method further comprises arranging a second segment of the first plurality of optical fibers in a one-dimensional array having a second pitch between centers of adjacent optical fibers of the first plurality of optical fibers. The second pitch is smaller than the first pitch. The arranging of the first segment and the second segment includes defining a transition segment between the first and second segments, and in the transition segment the one-dimensional array transitions from the first pitch proximate the first segment to the second pitch proximate the second segment. The method further comprises encapsulating the first plurality of optical fibers at least in the transition segment with a polymeric material. In at least a portion of the second segment, the first plurality of optical fibers extends beyond a boundary of the polymeric material.

In accordance with another embodiment of the disclosure, an optical fiber assembly formed by multiple steps is provided. One step comprises arranging a first segment of a first plurality of optical fibers in a one-dimensional array having a first pitch between centers of adjacent optical fibers of the first plurality of optical fibers, wherein a plurality of optical fiber legs extend from the one-dimensional array at an end of the first segment, each optical fiber leg of the plurality of optical fiber legs includes at least one optical fiber of the first plurality of optical fibers and a fiber optic connector that terminates the at least one optical fiber of the optical fiber leg. Another step comprises arranging a second segment of the first plurality of optical fibers in a one-dimensional array having a second pitch between centers of adjacent optical fibers of the first plurality of optical fibers, and the second pitch is smaller than the first pitch, wherein the arranging of the first segment and the second segment includes defining a transition segment between the first and second segments, and in the transition segment the one-dimensional array transitions from the first pitch proximate the first segment to the second pitch proximate the second segment. Another step comprises encapsulating the first plurality of optical fibers at least in the transition segment with a polymeric material. In at least a portion of the second segment, the first plurality of optical fibers extends beyond a boundary of the polymeric material.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to an optical fiber fan-out assembly with a polymeric material encapsulating a plurality of optical fibers arranged in an array in a variable fiber pitch transition segment, a fiber optic cable assembly incorporating such a fan-out assembly, and a method for fabricating a multi-fiber assembly that provides fan-out functionality. The variable pitch transition segment is arranged between a larger pitch first segment (e.g., having a 900 µm or 950 µm pitch corresponding to tight buffered optical fibers) and a smaller pitch second segment (e.g., having a 250 µm or 200 µm pitch corresponding to coated optical fibers). The transition segment as well as at least a portion of second segment are encapsulated with polymeric material. Multiple unbuffered optical fibers of the second segment may extend beyond the polymeric material to enable such optical fibers to be spliced. In the second segment, the inter-fiber pitch may match that of a conventional optical fiber ribbon, thereby permitting the use of efficient mass fusion splicing between the optical fiber fan-out assembly and an optical fiber ribbon (which may have been previously terminated an opposing end with a multi-fiber connector). Thereafter, the splice region and any previously uncovered fibers are encapsulated with polymeric material.

Such an optical fiber fan-out assembly and corresponding optical fiber cable assembly may dispense with a separate housing or strength member in transition regions (as well as in splice regions), and further dispense with the labor and expense associated with the use of furcation tubes. Migrating from complex fan-out assemblies to fan-out subassemblies with mass fusion splicing interfaces presents significant manufacturing and cost advantages compared to conventional furcation processes and reliance on single fiber fusion splicing. Production of optical fiber fan-out assemblies and corresponding optical fiber cable assemblies may be fully automated, without requiring the labor-intensive furcation process. Optical fiber fan-out assemblies and corresponding optical fiber cable assemblies disclosed herein may also exhibit levels of mechanical flexibility not previously achievable with assemblies previously relying on rigid furcation bodies/housings or other strength members.

Figure 1:
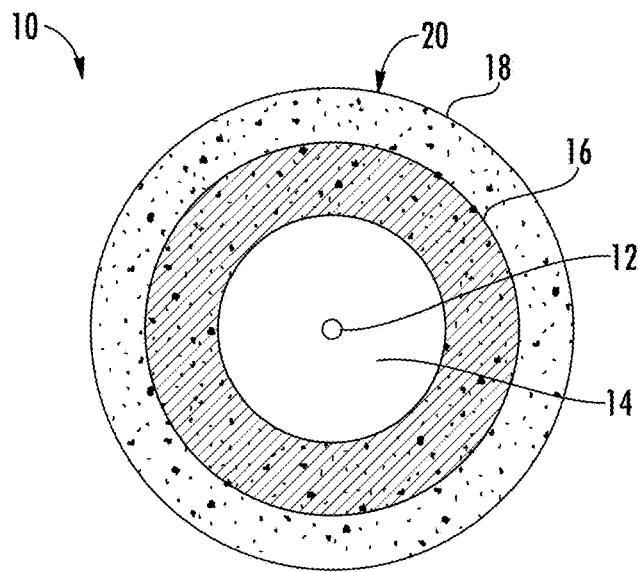
FIG. 1 is a cross-sectional view of a conventional coated optical fiber, prior to stripping of a multi-layer polymer coating from glass cladding.
Figure 2:
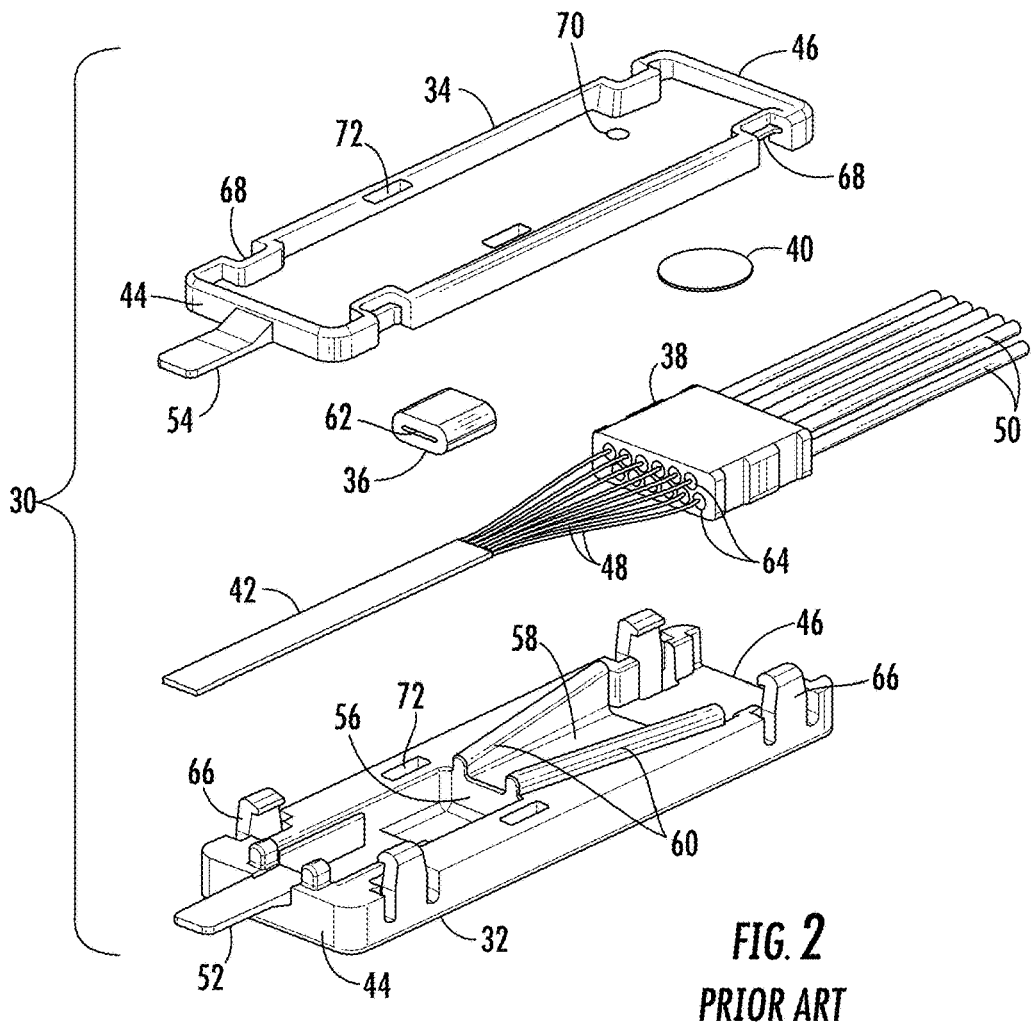
FIG. 2 is a exploded (i.e., unassembled) perspective view of a conventional ribbon fan-out kit suitable for separating fibers of an optical fiber ribbon into multiple fibers individually encased within furcation tubes.
Figure 3:
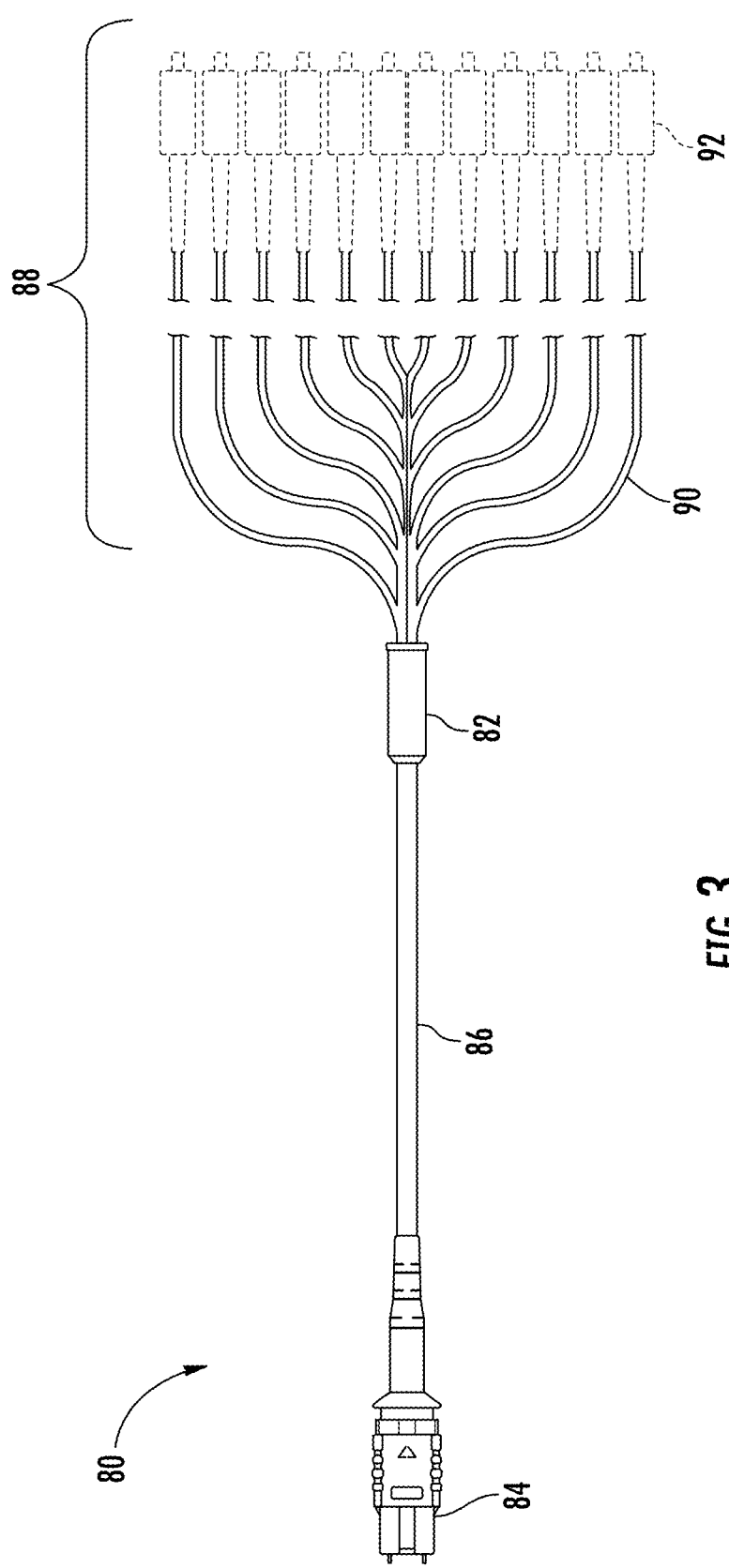
FIG. 3 is a top plan view of a conventional cable assembly utilizing a housing protecting fusion splices between separate connector pigtails and a multi-fiber cable terminated with a MPO connector.
Figure 4:
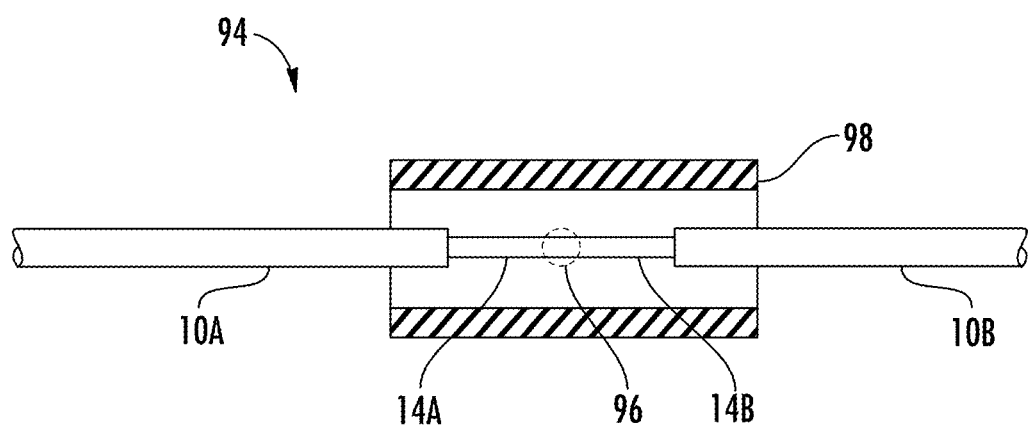
FIG. 4 is a schematic cross-sectional view of a fusion splice subassembly for protecting a splice joint between bare sections of two coated optical fibers, with the bare sections being formable by stripping of a coating therefrom.
Figure 5:
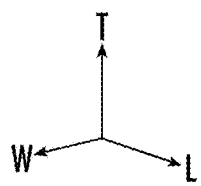
FIG. 5 is a perspective view of a portion of an optical fiber fan-out assembly according to one embodiment, including first, second, and transition segments, a bundling body encapsulating buffered sections of a plurality of optical fibers in the first segment, and a continuous polymeric material encapsulating unbuffered sections of the plurality of optical fibers in the transition and second segments.
Figure 5:
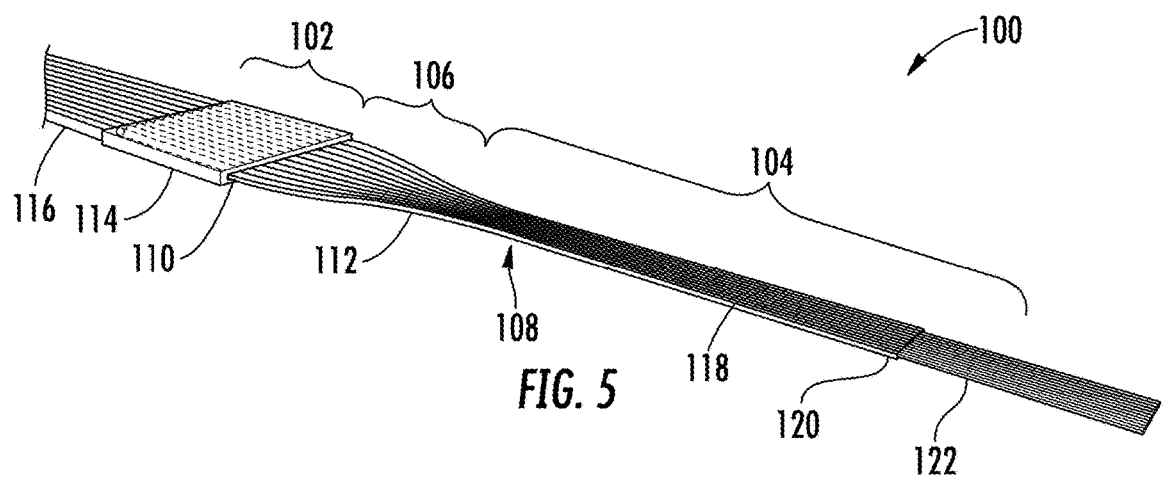

FIG. 5 is a perspective view of a central portion of an optical fiber fan-out assembly 100 according to one embodiment, including a first segment 102, a second segment 104, and a transition segment 106 arranged between the first and second segments 102, 104. A plurality of optical fibers 108 extends through, and forms a one-dimensional array in, each of the foregoing segments 102, 104, 106. In the first segment 102, the one-dimensional array of optical fibers 108 has a first pitch between centers of adjacent optical fibers 108, and in the second segment, the one-dimensional array of optical fibers 108 has a second pitch between centers of adjacent optical fibers 108, with the second pitch being smaller than the first pitch. A larger boundary 110 of the transition segment 106 has the first pitch, a smaller boundary of 112 of the transition segment 106 has the second pitch, and an interior of the transition segment 106 has a pitch that varies between the first pitch and the second pitch. The first pitch is larger (e.g., 900 µm) to accommodate tight buffer material (or jacket material and/or other tubular material) present on the optical fibers 108 in the first segment 102. Thus, the optical fibers 108 in the first segment 102 comprise buffered optical fibers.

A bundling body 114 encapsulates optical fibers 108 (and associated tight buffer or jacket material) over at least a portion of the first segment 102. Although FIG. 5 shows the bundling body 114 as being coextensive with the first segment 102, in certain embodiments the bundling body 114 may be confined to a portion of the first segment 102, or possibly omitted. Multiple optical fiber legs 116 extending from the bundling body 114 include one or more buffered (e.g., tight buffered) optical fibers of the plurality of optical fibers 108 and separate fiber optic connectors (not shown), which may embody simplex or duplex connectors, for terminating the buffered optical fibers. In the transition segment 106 and the second segment 104, the optical fibers 108 are devoid of buffer material (i.e., are unbuffered), enabling attainment of a smaller pitch (e.g., 250 µm or 200 µm) between adjacent optical fibers 108. A polymeric material 118 encapsulates optical fibers 108 in the transition segment 106 and in the second segment 104. The polymeric material 118 may be arranged in contact with the bundling body 114. In a portion of the second segment 104, the plurality of optical fibers 108 includes an uncovered section 122 that extends beyond a boundary 120 of the polymeric material 118. The presence of optical fibers 108 extending beyond the polymeric material 118 renders them available to be fusion spliced with another group of optical fibers (e.g., from an optical fiber ribbon), preferably via a mass fusion splicing process. In certain embodiments, the uncovered section 122 of optical fibers 108 extending beyond the boundary 120 of the polymeric material 118 may embody uncoated (bare glass) optical fibers.

The polymeric material 118 and the bundling body 114 (as well as a holding body, which will be described hereinafter in connection with FIG. 10) may each be generically described herein as an overcoating material. Overcoating materials may be formed by any suitable process such as molding (including but not limited to injection molding) or coating (e.g. dip coating, spray coating, or the like). Desired overcoating materials should be water-resistant, since moisture is known to chemically interact with the glass cladding of optical fibers and cause expansion of micro defects in the glass, thereby leading to long-term failure of optical fibers. Desired overcoating materials also may be free of sharp particles (e.g., inorganic filler particles) and air bubbles.

In certain embodiments, overcoating materials are applied by contacting a desired portion of an optical fiber fan-out assembly (e.g., including at least a transition segment thereof) with molten material, and then allowing the molten material to cool and solidify around fiber-containing portions of the optical fiber fan-out assembly. If a mold is used, then molten material may be supplied to the interior of a mold and then cooled and solidified, followed by removal of the solidified material from the mold. If a dip coating process is used, then a desired portion of an optical fiber fan-out assembly may be dipped into a heated pool of molten material, followed by removal of the optical fiber fan-out assembly portion to be cooled by an air or other gaseous environment, optionally aided by gas circulation.

In certain embodiments, one or more overcoating materials may include solid thermoplastic materials such as polyamide, polyolefin, a polyamide-polyolefin copolymer, a polyamide grafted polyolefin, and a copolyester. In certain embodiments, one or more coating materials may comprise a melt-flow thermoplastic adhesive material. Other thermoplastic materials as well as other polymeric non-thermoplastic materials may be used. To avoid thermal degradation of one or more coating layers of pre-coated sections of optical fibers, molten material (e.g., molten thermoplastic) used for overcoating materials should be maintained at a processing temperature below a melt temperature of the one or more coating layers. In certain embodiments, an overcoating material may comprise a UV-curable material; alternatively, an overcoating may be devoid of UV-curable components.

If an overcoating material includes a thermoplastic, in certain embodiments, molten thermoplastic material may also be maintained at a processing temperature at which the molten thermoplastic material has a melt viscosity in a range of from about 100 centipoises (cps) to about 10,000 cps, or more preferably in a subrange of from about 1000 cps to about 10,000 cps, or more preferably in a subrange of from about 2000 cps to about 4000 cps. A desired thermoplastic material should be chemically stable at the processing temperature, have a glass transition temperature of no greater than −40° C., have a service temperature spanning at least a range of from −40° C. to 85° C. without suffering significant mechanical and/or optical performance degradation, exhibit strong adhesion to fiber coating layers and bare glass, be free from charring, and/or exhibit minimal to no outgassing (e.g., of volatile organic compounds and/or other constituents). A glass transition temperature is the point at which a material goes from a hard brittle state to a flexible or soft rubbery state as temperature is increased. A common method for determining glass transition temperature uses the energy release on heating in differential scanning calorimetry. If a plastic (e.g., thermoplastic) material associated with an optical fiber is exposed to a temperature below its glass transition temperature, the material will become very hard, and the optical fiber may be susceptible to micro bend losses. In certain embodiments, service temperature of an overcoating material may be determined by compliance with one or more industry standards for telecommunication fiber reliability testing, such as (but not limited to): ITU-T G.652, IED60793-2, Telcordia GR-20-CORE, and TIA/EIA-492. A desirable overcoating material is preferably not subject to delamination during normal handling over the required service conditions and lifetime of an optical fiber assembly.

In certain embodiments, overcoating material present over at least a portion of an optical fiber fan-out assembly (including but not limited to a transition segment) is conformally coated over optical fibers arranged in a one-dimensional array, with a narrow width profile and a relatively low thickness profile relative to optical fibers contained therein. Together with mechanical properties of the overcoating material, providing the overcoating material with narrow width and low thickness profiles serves to enhance mechanical flexibility of the optical fiber fan-out assembly.

With continued reference to FIG. 5, the plurality of optical fibers 108 is arranged in a one-dimensional array (albeit with different pitch in certain regions), with the one-dimensional array having a lengthwise axis L, a widthwise axis W orthogonal to the lengthwise axis L, and a thickness axis T orthogonal to the lengthwise axis L and the widthwise axis W. In certain embodiments, the polymeric material 118 encapsulating the plurality of optical fibers 108 in the transition segment 106 has a narrow width profile, with a width along the widthwise axis W that is preferably no greater than 3 mm (or no greater than 2 mm, or no greater than 1 mm, or no greater than 0.75 mm, or no greater than 0.5 mm) wider at any position than a widthwise extent of the plurality of optical fibers 108 in the transition segment 106. In certain embodiments, the polymeric material 118 encapsulating the plurality of optical fibers 108 in the transition segment 106 has a low thickness profile, with a thickness along the thickness axis T that is preferably no greater than 3 mm (or no greater than 2 mm, or no greater than 1 mm, or no greater than 0.75 mm, or no greater than 0.5 mm) thicker than a thickness of the plurality of optical fibers in the transition segment 106. Presence of the polymeric material 118 encapsulating the plurality of optical fibers 108 dispenses with the need for an RFK-style housing.

As noted previously, the presence of overcoating material with a narrow width profile, a low thickness profiles, and suitable mechanical properties permits an optical fiber fan-out assembly to exhibit a high degree of flexibility. In certain embodiments, optical fibers 108 extending beyond a boundary 120 of the polymeric material 118 may be fusion spliced to an optical fiber ribbon 138 (e.g., incorporating the second plurality of optical fibers 132 shown in FIG. 6), and flexibility of at least portions of the optical fiber fan-out assembly may be sufficiently high to permit comparison to the flexibility of the optical fiber ribbon. For example, in certain embodiments, one or more of the transition segment 106, the first segment 102, or the second segment 104 may be at least 30% as flexible (or at least 40% as flexible, or at least 50% as flexible, or at least 60% as flexible, or at least 70% as flexible) as the optical fiber ribbon in bending about the widthwise axis W or the thickness axis T.

In certain embodiments, the polymeric material 118 in the transition segment 106 is conformally coated over the plurality of optical fibers 108, such that a shape of the polymeric material 118 closely follows an outer boundary of an array formed by the plurality of optical fibers 108. In certain embodiments, in at least a portion of the transition segment 106 proximate the second segment 104 the array of optical fibers 108 comprises a one-dimensional array, and outermost optical fibers 108 of the in the transition segment 106 embody S-bends (i.e., corresponding to half a period of a cosine function) without abrupt changes in direction. Moreover, in certain embodiments, the polymeric material encapsulating the plurality of optical fibers 108 in the transition segment 106 is provided in a similar shape without abrupt (e.g., stepwise) changes in width. In certain embodiments, a first widthwise dimension corresponding to a maximum widthwise extent of the one-dimensional array varies with position along a lengthwise dimension of the transition segment 106, and a second widthwise dimension corresponding to a maximum widthwise extent of the polymeric material 118 varies with position along the lengthwise dimension of the transition segment 106. In such embodiments, the second widthwise dimension exceeds the first widthwise dimension at each position by a width differential, and the width differential varies with position by no more than about 30% (or by no more than about 20%, or by no more than about 15%, or by no more than about 10%, or by no more than about 5%) along the lengthwise dimension of the transition segment 106. Restated, in such an instance, the width of the polymeric material 118 generally follows a width of a plurality of optical fibers 108 encapsulated therein.

Figure 6:
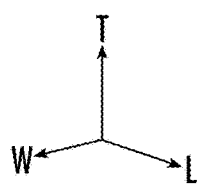
FIG. 6 is a perspective view of a portion of an optical fiber cable assembly incorporating an optical fiber fan-out assembly according to FIG. 5, following fusion splicing of optical fibers of the fan-out assembly to optical fibers of a ribbon cable and overcoating of the splice region.
Figure 6:
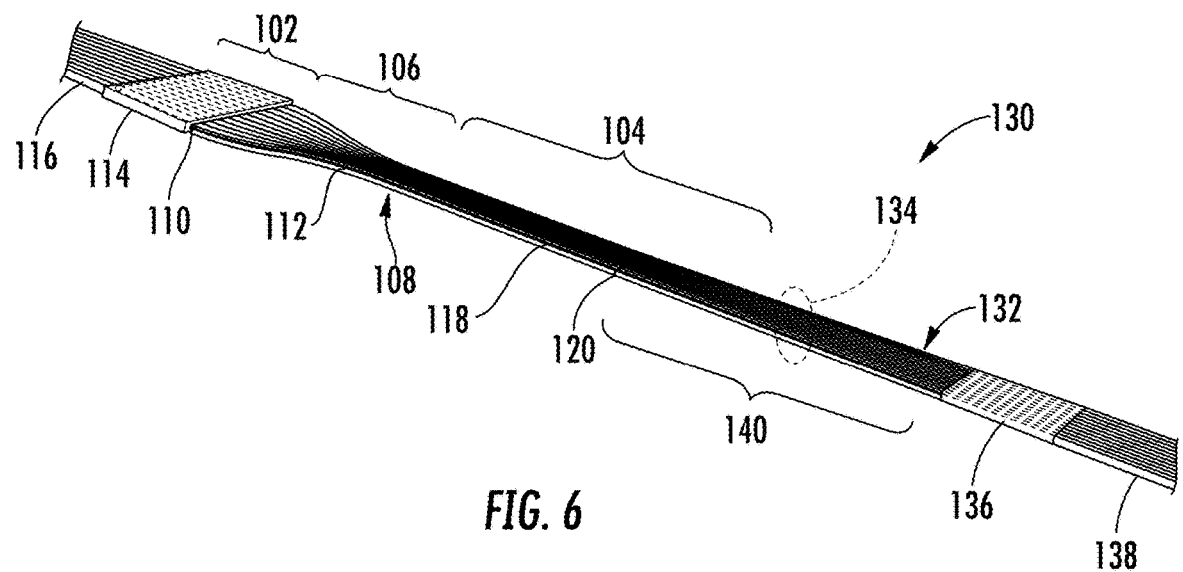

As shown in FIG. 6, the optical fiber fan-out assembly 100 is devoid of a housing and devoid of a strength member arranged in, on, or around the polymeric material 118 encapsulating the plurality of optical fibers 108 in the transition segment 106.

Figure 15:
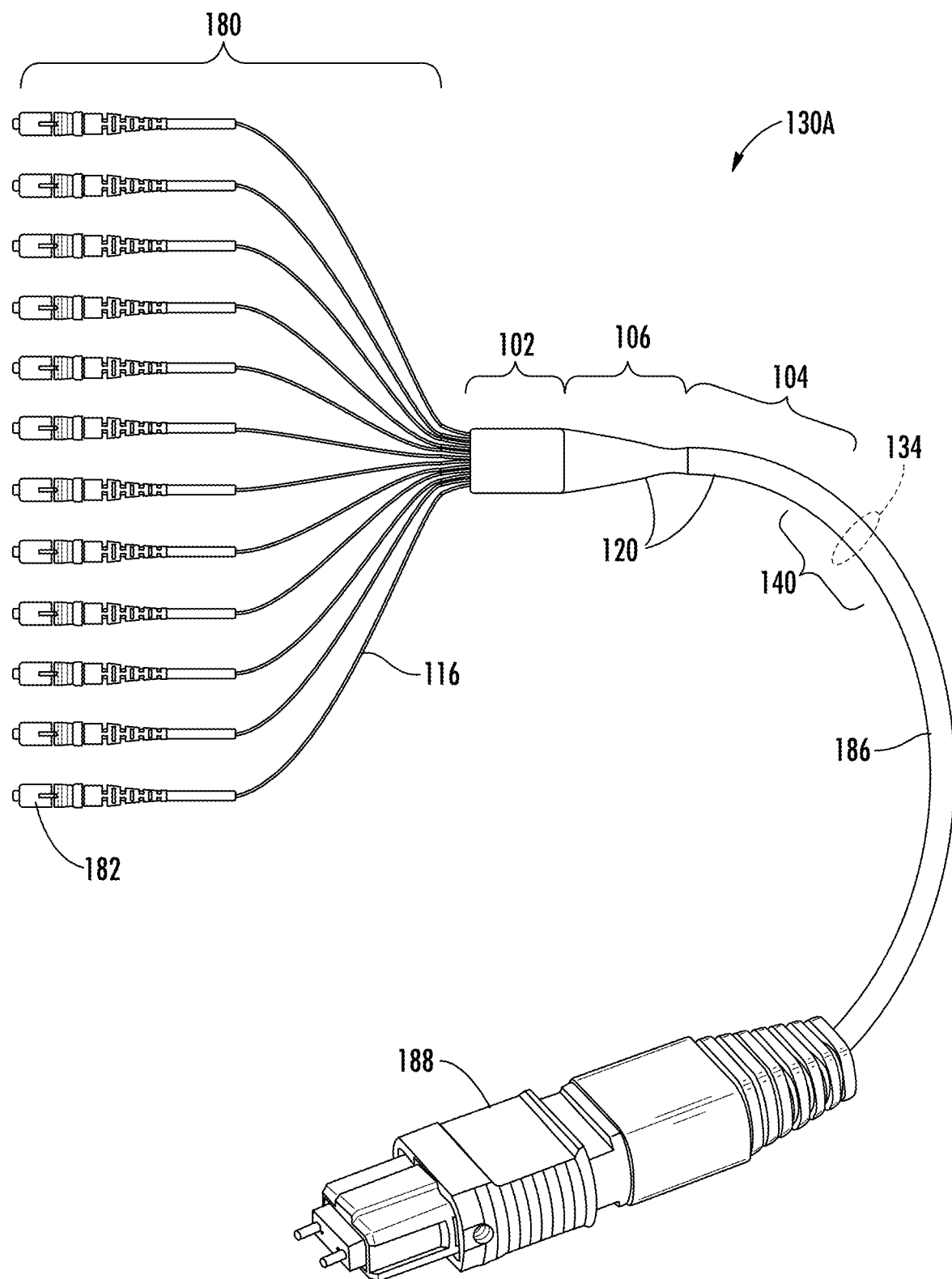
FIG. 15 is a perspective view of a fiber optic cable assembly incorporating the optical fiber fan-out assembly of FIG. 13, following splicing of the optical fiber fan-out assembly to an optical fiber ribbon pre-terminated with a MPO connector.

FIG. 6 is a perspective view of a portion of an optical fiber cable assembly 130 incorporating an optical fiber fan-out assembly as described previously herein in connection to FIG. 5. Elements of FIG. 6 corresponding exactly to FIG. 5 will not be described again for sake of brevity. The optical fiber cable assembly 130 incorporates the above-described optical fiber fan-out assembly 100 following: (A) fusion splicing of the plurality optical fibers 108 (i.e., a "first" plurality of optical fibers) of the optical fan-out assembly 100 to a plurality of optical fibers 132 (i.e., a "second" plurality of optical fibers) of the optical fiber ribbon 138, and (B) overcoating of a fusion splice region 134 as well as previously uncovered or bare (e.g., previously stripped) sections of optical fibers (e.g., uncovered section 122 of the plurality of optical fibers 108 shown in FIG. 5) with a second polymeric material 140. Preferably, a portion of the second polymeric material 140 extends over the boundary 120 of the (first) polymeric material 118, to ensure formation of a continuous barrier over the (first) plurality of optical fibers 108. Optionally, an extension portion of the second polymeric material 136 may also extend over an unstripped section of the optical fiber ribbon 138, to provide for a continuous barrier over any stripped (i.e., bare) portions of the second plurality of optical fibers 132. Essentially, presence of the polymeric material 118 and the second polymeric material 140 in a coating that substantially conforms to a perimeter of the (first) plurality of optical fibers 108 and the second plurality of optical fibers 132 serves to "ribbonize" the plurality of optical fibers 108, 132. In certain embodiments, the second polymeric material 136 may be compositionally the same as the polymeric material 118 covering the first, second, and transition segments 102, 104, 106; in other embodiments, the polymeric material 118 and the second polymeric material 1136 may be compositionally different. Compositional details and exemplary application methods for the second polymeric material 140 may be the same as previously described in connection with the polymeric material 118 of FIG. 5. As shown, the optical fiber cable assembly 130 is devoid of any housing or strength member arranged in, on, or around (i) the polymeric material 118 encapsulating the first plurality of optical fibers (at least) in the transition segment, and (ii) the second polymeric material 136 encapsulating the fusion splice region 134 as well as previously stripped (bare) glass sections of the (first) plurality of optical fibers 108 and the second plurality of optical fibers 132. It is to be appreciated that a distal end of the optical fiber ribbon 138 (which opposes the previously stripped (bare) glass sections of the second plurality of optical fibers 132 terminating at the splice region 134) may be terminated with a multi-fiber connector (not shown, but as depicted in FIG. 15), such as a MPO connector or a connector any other suitable type.

Figure 7:
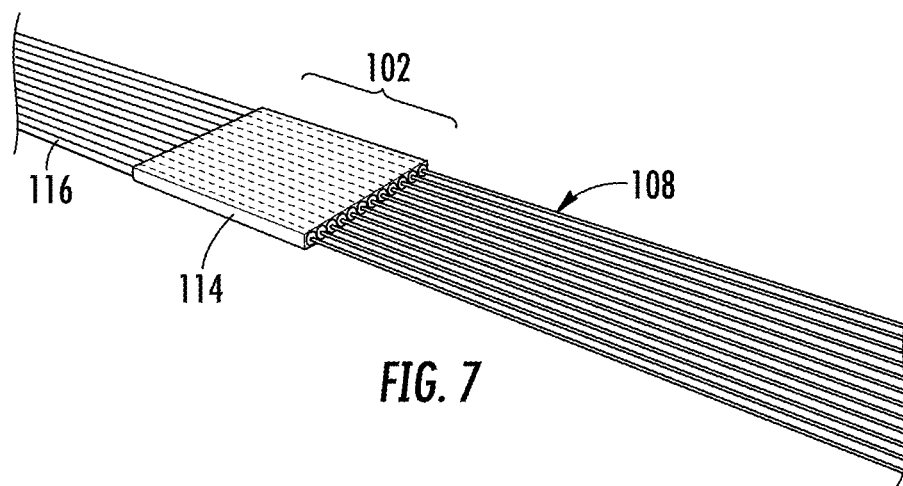
FIG. 7 is a perspective view of a portion of the optical fiber fan-out assembly of FIG. 5 during one step in the fabrication thereof, showing twelve connector pigtails held together at a first pitch by a bundling body to form a first segment, prior to formation of a transition segment.

FIG. 7 is a perspective view of a portion of the optical fiber fan-out assembly 100 of FIG. 5 during one step in the fabrication thereof, showing tight buffered optical fiber legs 116 formed from twelve pre-fabricated connector pigtails (each including a fiber optic connector terminating at least one tight optical fiber) being held together by a bundling body 114 to form a first segment 102, prior to formation of a transition segment. For each optical fiber leg 116, a desired length (e.g., about 8 cm) may be initially removed in preparation for formation of the bundling body 113. In certain embodiments, different optical fiber legs 116 may have different lengths. As illustrated, the first segment 102 includes a plurality of optical fibers 108 having a first pitch (e.g., 900 µm), with the first pitch between adjacent fibers of the plurality of optical fibers 108 being the same beyond either end of the bundling body 114. The bundling body 114 may be formed by any suitable process and using any suitable material described previously herein in connection with overcoating materials. In certain embodiments, the bundling body 114 may be formed by a melt flow thermoplastic adhesive material using a process such as dip coating or molding. The purpose of the bundling body 114 is to hold the plurality of optical fibers 108 in a fixed one-dimensional array to permit subsequent formation of a transition segment, as shown in FIGS. 8 and 9.

Figure 8:
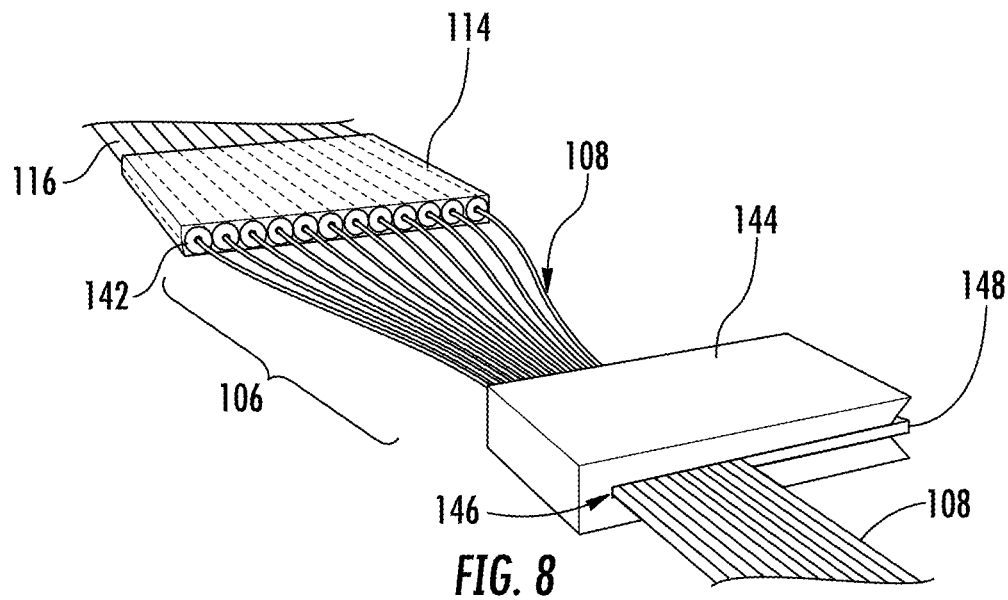
FIG. 8 is a perspective view of a portion of the optical fiber fan-out assembly of FIG. 5 during another step in the fabrication thereof, showing a section of unbuffered optical fibers received within a fiber sorting fixture to set a second pitch, and to form the shape of a transition segment prior to encapsulation of the transition segment.

FIG. 8 is a perspective view of a portion of the optical fiber fan-out assembly 100 of FIG. 5 during another step in the fabrication thereof, showing a section of the plurality of optical fibers 108 received within a fiber sorting fixture 144 to set a second pitch, and to form the shape of a transition segment 106 prior to encapsulation of the transition segment 106 with polymeric material. Starting at left, for the optical legs 116 held together by the bundling body 114, tight buffers 142 surrounding the optical fibers 108 are visible, having been maintained intact during formation of the bundling body 114. Each optical leg 116 is devoid of a furcation tube. Within the bundling body 114, the tight buffers 142 and optical fibers 108 are kept straight and parallel, configured as a one-dimensional array with a constant pitch between adjacent optical fibers 108. The fiber sorting fixture 144 includes a slot 146 having at least one opening dimension (e.g., height) that closely matches a corresponding dimension of unbuffered sections of optical fibers 108. Such optical fibers 108 may be coated, providing an outer diameter of about 250 µm or about 200 µm. The optical fibers 108 may initially be fed into the slot 146 at a position close to the bundling body 114, where positions of individual optical fibers 108 are discernable and well-defined without crossover. The fiber sorting fixture 144 may then be moved away from the bundling body 114 to a designated distance to form the transition segment 106. Within the slot 146, the optical fibers may be closely packed by lateral compression applied by a shim 148. The optical fibers 108 are held within the fiber sorting fixture 144 at a second pitch (e.g., 250 µm or 200 µm) that is smaller than the first pitch maintained by the bundling body 114, and the second pitch may be maintained for optical fibers exiting the fiber sorting fixture 144.

Figure 9:
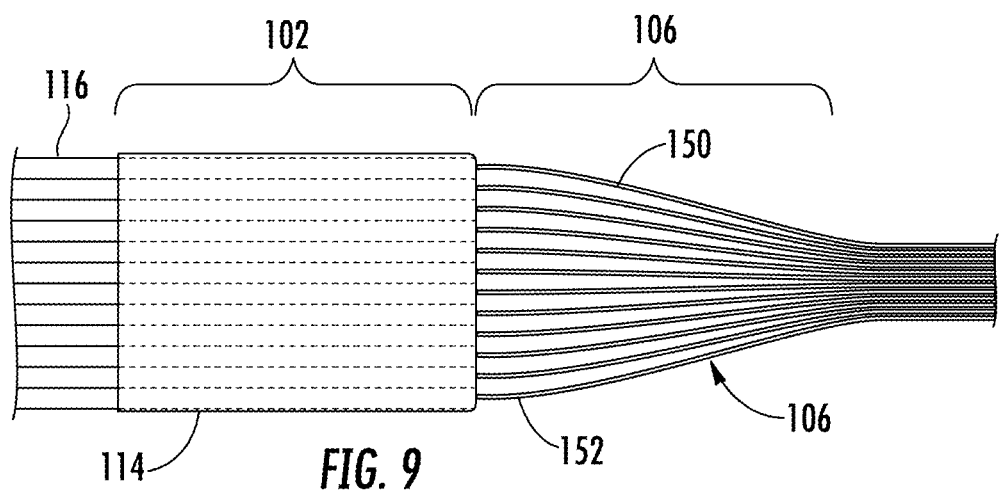
FIG. 9 is a top plan view of a portion of the optical fiber fan-out assembly of FIG. 5 during a step in the fabrication thereof, following formation of the shape of the transition segment prior to encapsulation thereof, showing the shape of bends of the optical fibers in the transition segment.

FIG. 9 is a top plan view of a portion of the optical fiber fan-out assembly 100 of FIG. 5 during a step in the fabrication thereof, following formation of the shape of the transition segment 106 prior to encapsulation thereof, showing the shape of bends of the optical fibers 108 in the transition segment 106. As shown, the outermost optical fibers 150, 152 in the transition segment 106 experience the tightest bend radius. The shape of the transition segment 106 in certain embodiments is designed to maximize the bend radius along the path. In certain embodiments, the path of at least the outermost optical fibers 150, 152 in the transition segment 106 is shaped corresponding to a half period of a cosine function, which is also known as an S-bend in the field of optical waveguide design. For example, for a 12 fiber fan-out the outermost fiber has a lateral position y as a function of longitudinal position x:

$$y = \frac{5.5(P_1 - P_2)}{2}\cos\left(\frac{\pi x}{L}\right),$$

where $P_1$ is the first (larger) fiber pitch, $P_2$ is the second (smaller) fiber pitch, and L is the length of the transition segment. The preferred transition length is about 20 mm, so that the minimum bend radius, which occurs at both ends of the transition, is at least 22.7 mm. This bend radius does not present any bend loss for standard single mode fibers. When considering out-of-plane flexing of the transition segment 102, the effective bend radius which includes in-plane and out-of-plane bends is reduced. For example, if the out-of-plane bend radius is 25 mm, the effective bend radius is reduced to 16.8 mm, for which the macro bend loss for Corning® SMF-28® Ultra fiber (commercially available from Corning, Inc., Corning, N.Y.) is still less than 0.01 dB at for transmission of 1625 nm. Thus, in certain embodiments, each S-bend formed in the transition segment 106 preferably includes a minimum bend radius of at least 22.7 mm.

Figure 10:
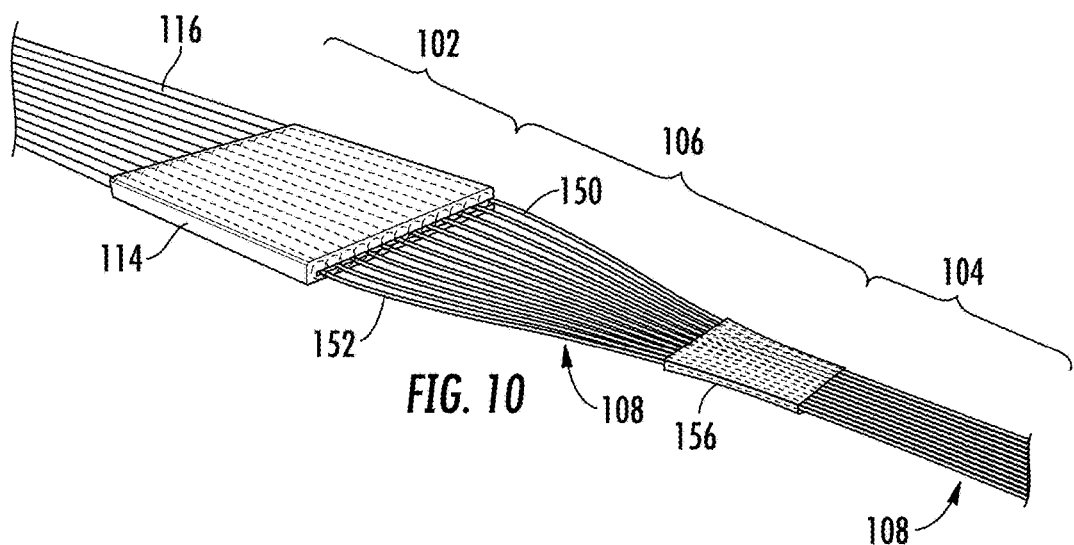
FIG. 10 is a perspective view of a portion of the optical fiber fan-out assembly of FIG. 5 during a step in the fabrication thereof, following formation of a holding body to encapsulate the plurality of optical fibers along an interface between the second segment and the transition segment to set positions of optical fibers in the transition segment prior to encapsulation thereof.

FIG. 10 is a perspective view of a portion of the optical fiber fan-out assembly 100 of FIG. 5 during a step in the fabrication thereof, following formation of a holding body 156 to encapsulate the plurality of optical fibers 108 along an interface between the second segment 104 and the transition segment 106, to set positions of the optical fibers 108 of the transition segment 106 prior to encapsulation thereof. The holding body 156 may be formed proximate to a position where the optical fibers 108 were held by the fiber sorting fixture 144 (shown in FIG. 8). In certain embodiments, the holding body 156 can be formed while the optical fibers 108 are retained by the fiber sorting fixture 144, and following formation of the holding body 156, the fiber sorting fixture 144 may be removed. The holding body 156 may be formed by any suitable process and using any suitable material described previously herein in connection with overcoating materials. In certain embodiments, the holding body 156 may be formed by a melt flow thermoplastic adhesive material using a process such as dip coating or molding. In certain embodiments, the holding body 156, the bundling body 114, and a subsequently applied polymeric material 120 (shown in FIG. 11) may be compositionally the same. In other embodiments, one or more of the holding body 156, the bundling body 114, and the polymeric material 120 may be compositionally different from the others. In yet other embodiments, the holding body 156 may be tape or the like.

Figure 11:
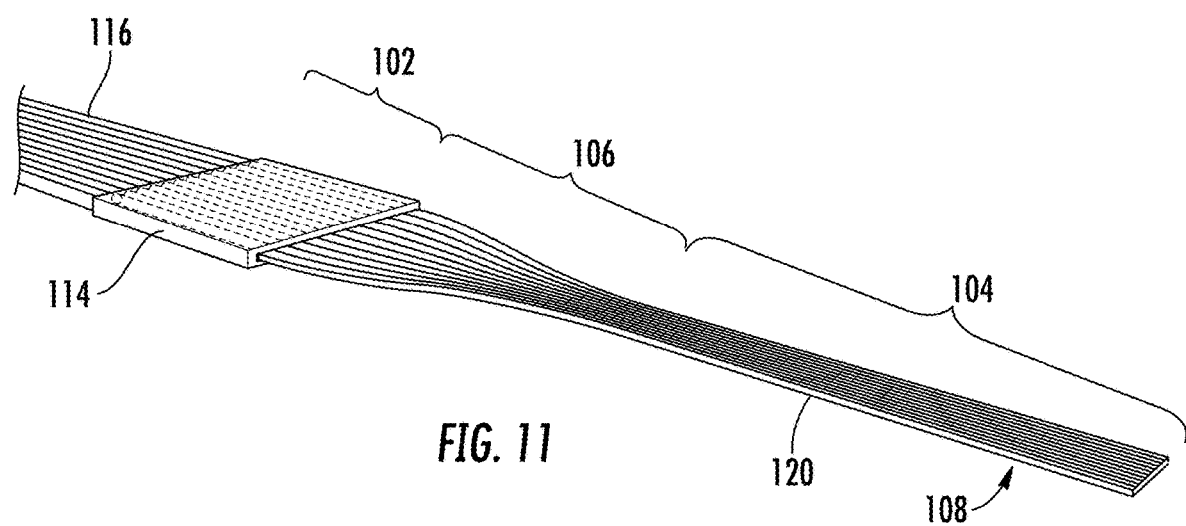
FIG. 11 is a perspective view of a portion of the optical fiber fan-out assembly of FIG. 5, following encapsulation of the transition segment and a portion of the second segment.

Following formation of the holding body 156, optical fibers 108 in a remainder of the transition segment 106 as well as any desired length (e.g., some or all) of the second segment 104 may be coated with polymeric material 120, as shown in FIG. 11. Such polymeric material preferably encapsulates at least a portion of the holding body 156. The resulting optical fiber fan-out assembly includes multiple optical fiber legs 116 extending from the bundling body 114, as well as optical fibers 108 arranged in a first segment 102 having a constant, large fiber pitch, a transition segment 106 having a variable pitch, and a second segment 104 having a constant, small fiber pitch. Optical fibers 108 in the transition segment 106 and at least a portion of the second segment 104 are encapsulated with polymeric material 120, which is preferably continuous in character. Although FIG. 11 shows the entire second segment 104 as being encapsulated with polymeric material 120, it is to be appreciated that along an end portion of the second segment 104, the polymeric material 120 and any coating on the optical fibers 108 can be stripped, and ends of the resulting bare optical fibers 108 may be cleaved, to prepare the optical fibers 108 to be fusion spliced (e.g., mass fusion spliced) to fibers of another optical ribbon (not shown). Since optical fibers 108 in the second segment 104 may have the same pitch as optical fibers of a conventional optical fiber ribbon, a conventional mass fusion splicing apparatus may be used to mass fusion splice the optical fiber fan-out assembly 100 to the other optical ribbon.

In certain embodiments, coated optical fibers subject to being fusion spliced and encapsulated according to methods disclosed herein are prepared for fusion splicing (e.g., by stripping ends thereof) utilizing non-contact fiber stripping methods and/or apparatuses, such as those disclosed in U.S. Pat. No. 9,167,626 ("the '626 patent"), which is hereby incorporated by reference herein. Briefly, the '626 patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength. Following stripping of at least one coating layer from the end sections of the optical fibers, the bare glass end sections of the optical fibers may be fusion spliced using conventional fusion splicing method steps known to those skilled in the art. Variations of the techniques disclosed in the '626 patent are disclosed in U.S. Patent Application Publication Nos. 2016/0349453 and 2017/0001224, the disclosures of which are also hereby incorporated by reference herein. Non-contact stripping methods using lasers or hot gases, as well as mechanical stripping methods, are also possible in certain embodiments.

Figure 12A:
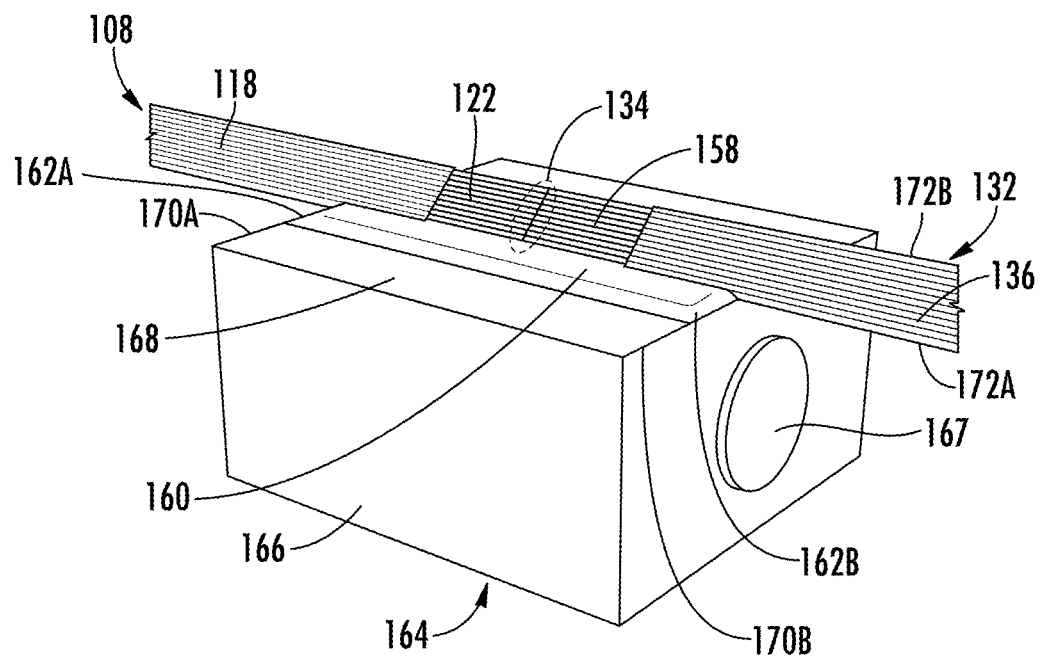
FIG. 12A is an upper perspective view illustration of a bare fusion spliced section of two optical fiber ribbon segments forming a spliced ribbon cable, with a first lateral edge portion of the spliced ribbon cable submerged in a pool of molten thermoplastic material atop a substantially level, flat heated surface, and with the ribbon cable being tilted at an approximately forty-five degree angle during a ribbon cable insertion step, such that a second lateral edge portion of the spliced ribbon cable is arranged at a level above the first lateral edge portion.
Figure 12B:
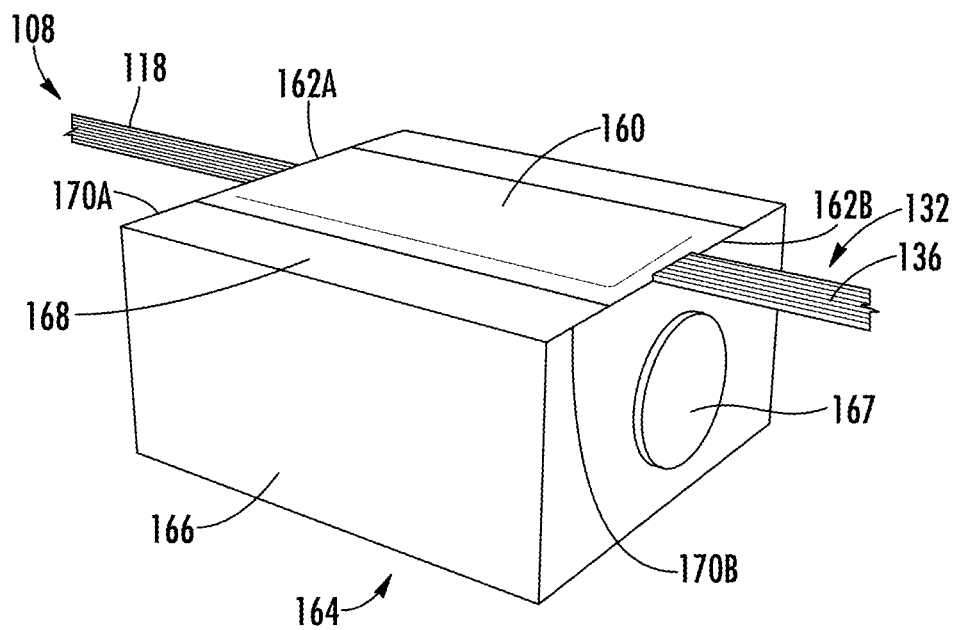
FIG. 12B illustrates the items of FIG. 12A, with the entire fusion spliced section of the spliced ribbon cable disposed in the pool of molten thermoplastic material atop the substantially level, flat heated surface, and with the first lateral edge portion being arranged at substantially the same horizontal level as the second lateral edge portion of the spliced ribbon cable.

FIGS. 12A and 12B illustrate a heating apparatus 164 useable for coating portions of fusion spliced first and second pluralities of optical fibers 108, 132 with thermoplastic material, such as during fabrication of a cable assembly incorporating a fan-out assembly. The first plurality of optical fibers 108 includes a section coated with polymeric material 118 as well as an uncovered (e.g., bare glass) section 122, and may correspond to the optical fiber fan-out assembly 100 of FIG. 5. The second plurality of optical fibers 132 is included in an optical fiber ribbon 138 of which a portion is stripped to yield an uncovered (e.g., bare glass) section 158. A distal end of the optical fiber ribbon 138 may be terminated with a multi-fiber connector (not shown). Ends of the uncovered sections 122, 158 are fusion spliced (e.g., mass fusion spliced) at a splice region 134. The heating apparatus 164 includes a body 166 that contains an internal electric cartridge heater 167. A pool of molten thermoplastic material 160 is arranged atop a substantially level, flat heated surface 168. Lateral edges 162A, 162B of the pool of molten thermoplastic material 160 extend to lateral edges 170A, 170B of the flat heated surface 168 without overflowing, due to lower temperature at the lateral edges 170A, 170B as well as surface tension of the molten thermoplastic material 160. As shown in FIG. 12A, the uncovered sections 122, 158 and the splice region 134 are arranged above the pool of molten thermoplastic material 160, with the splice joint 134 roughly centered above the pool, and with the length of the pool exceeding the combined length of the uncovered sections 122, 158. As shown, a first side 172A of the fusion spliced first and second pluralities of optical fibers 108, 132 initially contacts the pool of molten thermoplastic material 160, while the second side 126B of the fusion spliced first and second pluralities of optical fibers 108, 132 remains elevated above the pool. Thereafter, the remainder of the fusion spliced first and second pluralities of optical fibers 108, 132 gradually tilt to a more horizontal orientation and are submerged into the pool, as shown in FIG. 12B. Such figure shows the uncovered sections 122, 158 and the splice region 134 submerged in the pool of molten thermoplastic material 160. Thereafter, the fusion spliced first and second pluralities of optical fibers 108, 132 may be removed from the pool of molten thermoplastic material 160 in substantially a reverse manner from which it was introduced into the pool, and the molten liquid may be cooled to yield a solid thermoplastic overcoating that extends over the previously uncovered sections 122, 158 and the splice region 134. In certain embodiments, the solid thermoplastic overcoating may comprise a melt-flow thermoplastic adhesive material, such as TECHNOMELT® PA 6208 polyamide material (Henkel Corp., Dusseldorf, Germany).

Further details regarding thermoplastic overcoating of fusion spliced optical fibers and/or portions of fiber optic cable assemblies are disclosed in International Application No. PCT/US2018/021685 filed on Mar. 9, 2018, wherein the content of the foregoing application is hereby incorporated by reference.

Figure 13:
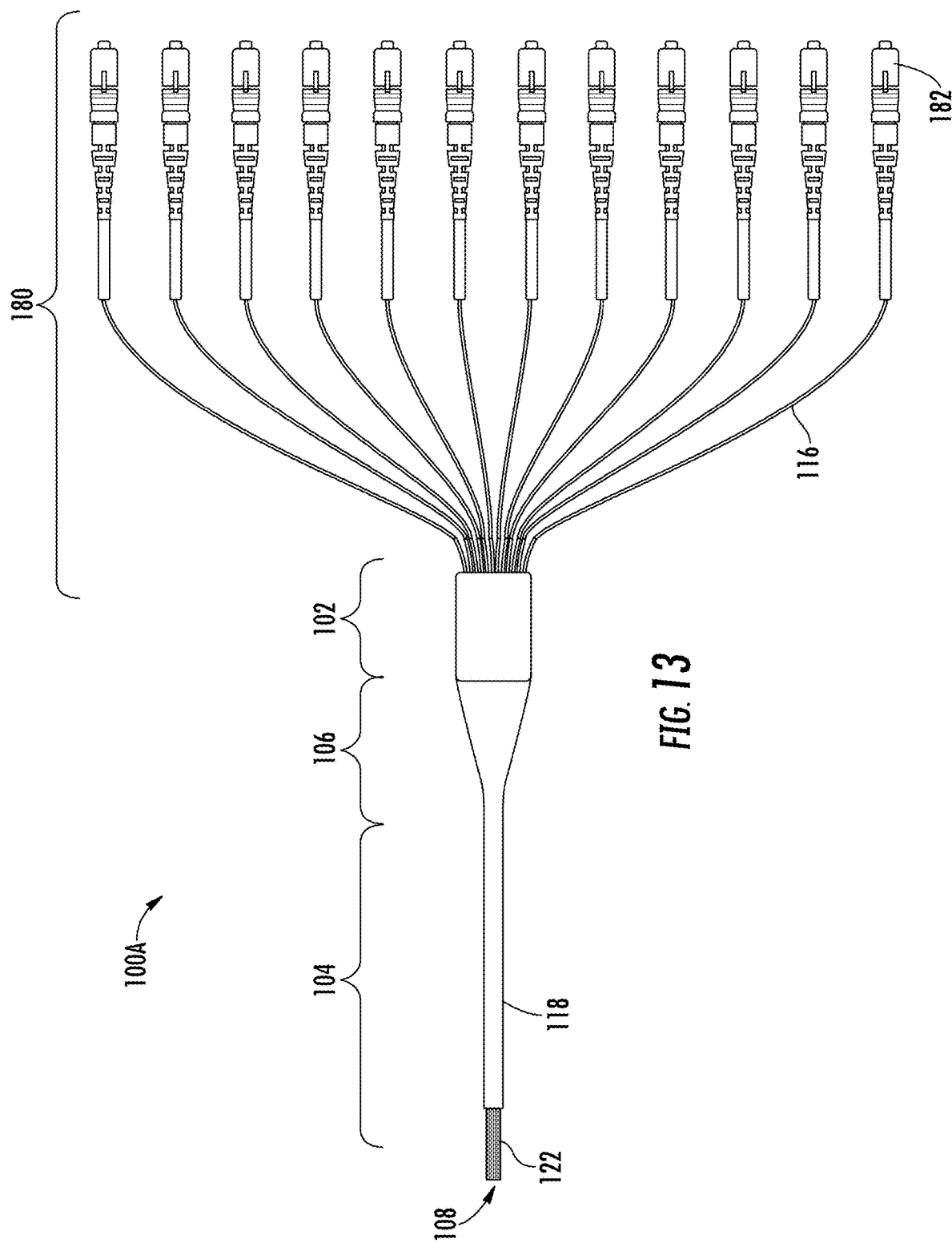
FIG. 13 is a top plan view of the optical fiber fan-out assembly of FIG. 5 including the twelve connector pigtails extending from the first segment, polymeric material encapsulating the transition segment and a portion of the second segment, and stripped and cleaved optical fibers extending beyond the polymeric material of the second segment.

FIG. 13 is a top plan view of an optical fiber fan-out assembly 100A according to one embodiment, including a single group 180 of twelve optical fiber legs 116 at one end, and twelve stripped and cleaved bare glass optical fibers 108 exposed as part of an uncovered section 122 at an opposite end. Each optical fiber leg 180 is terminated with a separate fiber optic connector 182. Although a simplex connector 182 is shown, in alternative embodiments each optical fiber leg 116 may include two optical fibers 108 and be terminated with a duplex connector. In certain embodiments, each optical fiber leg 116 is terminated with a fiber optic connector selected from the group consisting of: simplex SC connectors, simplex LC connectors, duplex SC connectors, and duplex LC connectors. Although FIG. 13 illustrates a single group 180 of substantially identical optical fiber legs 116, in certain embodiments multiple groups of optical fiber legs having different characteristics (e.g., different lengths, different connectors, etc.) may be provided in a single optical fiber fan-out assembly. Moreover, although twelve optical fiber legs 116 are illustrated, it is to be appreciated that any desired number of optical fibers and optical fiber legs may be employed in optical fiber fan-out assemblies (and corresponding cable assemblies) as disclosed herein.

With continued reference to FIG. 13, the optical fiber legs 116 extend from a constant width (and larger fiber pitch) first segment 102, with a variable width (and variable fiber pitch) transition segment 106 arranged between the first segment 102 and a constant width (and smaller fiber pitch) second segment 104. Polymeric material 118 encapsulates the transition segment 106, a portion of the second segment 104, and the first segment 102. An uncovered section 122 of the second segment 104 includes portions of the plurality of optical fibers 108 extending beyond the polymeric material 118. Such optical fibers 108 extending beyond the polymeric material 118 in the uncovered section 122 may optionally be stripped (bare glass) and cleaved, and are available for fusion splicing.

Figure 14:
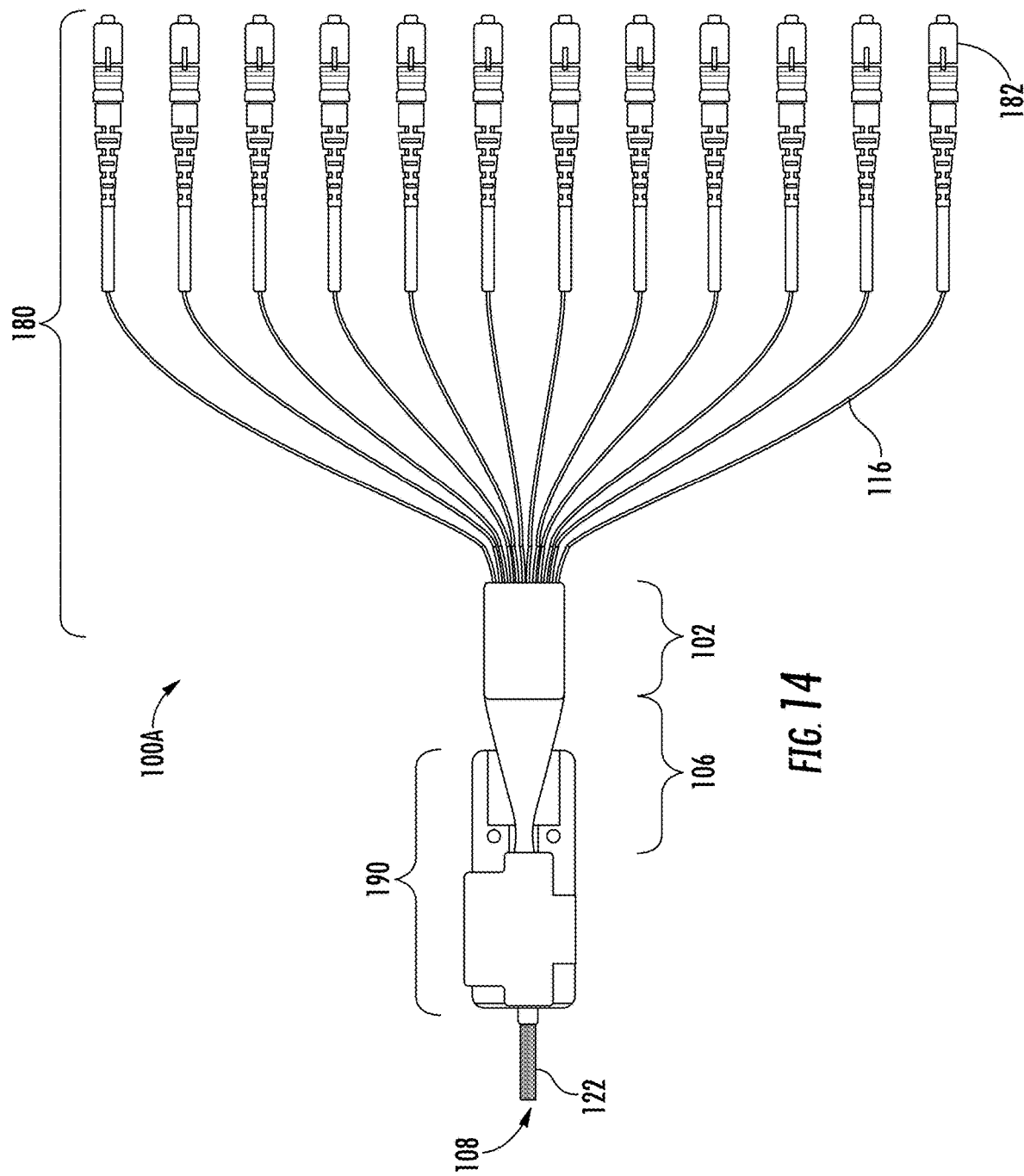
FIG. 14 is a top plan view of the optical fiber fan-out assembly of FIG. 13, with the second segment retained by a fiber holding jig of a mass fusion splicing apparatus to prepare the optical fiber fan-out assembly for mass fusion splicing.

FIG. 14 is a top plan view of the optical fiber fan-out assembly 100A of FIG. 13, with the second segment 104 retained by a fiber holding jig 190 of a conventional mass fusion splicing apparatus (not shown) to prepare the optical fiber fan-out assembly 100A for mass fusion splicing to an optical fiber ribbon (not shown), which may be held by another conventional fiber holding jig. An example of a suitable mass fusion splicer may include a Sumitomo Type-66M12 mass fusion splicer (Sumitomo Electric Industries, Ltd., Tokyo, Japan). Elements of FIG. 14 corresponding exactly to FIG. 13 will not be described again for sake of brevity.

FIG. 15 is a perspective view of one embodiment of a fiber optic cable assembly 130A incorporating the optical fiber fan-out assembly 100A of FIG. 13, following splicing of the optical fiber fan-out assembly to an optical fiber ribbon 186 that is pre-terminated with a MPO connector 188, and following encapsulation of the splice region 134 with a second polymeric material 140 (e.g., as described previously in connection with FIG. 6). A first polymeric material 120 may encapsulate the transition segment 106, at least a portion of the second segment 104, and optionally at least a portion of the first segment 102. Following mass fusion splicing between bare fiber (e.g., previously uncovered or previously stripped) sections of the second segment 104 and the optical fiber ribbon 186 to form the splice region 134, the bare fiber sections as well as the splice region are encapsulated with the second polymeric material 140. Preferably, the second polymeric material 140 overlaps at least a portion of the first polymeric material 120 to provide continuous protection over a section extending from the MPO connector 188 to the first segment 102. Although a MPO connector is illustrated in FIG. 15, it is to be appreciated that the connector 188 may embody any suitable type of multi-fiber connector.

Current mass fusion splicing technology permits fusion splicing of two groups of optical fibers each arranged in a one-dimensional array (i.e., a linear array). In certain embodiments, a plurality of optical fibers extend through a first segment, a second segment, and a transition segment disposed between the first and second segments, wherein: (i) in at least a portion of the first segment, the plurality of optical fibers are arranged in a multi-dimensional array or other multi-dimensional configuration, and (ii) in at least a portion of the second segment, the plurality of optical fibers are arranged in a one-dimensional array. Such embodiments still permit distal ends of optical fibers of the second segment to be aligned and fusion spliced with ends of optical fibers of an optical fiber ribbon using a mass fusion splicing apparatus. The term "multi-dimensional configuration" in this contacts refers to an arrangement in which multiple fibers are arranged in a three-dimensional manner within a jacket or other tubular material; i.e., an arrangement other than a one-dimensional array. And the term "multi-dimensional array" in this context may include a regularly ordered array (e.g., a 2×6 array, a 2×4 array, etc.), a hexagonally packed cylindrical array (e.g., with an uppermost row of three fibers, a second row of four fibers, a third row of three fibers, and a bottom row of two fibers), or the like. Potential benefits of arranging multiple optical fibers in multi-dimensional configurations are that the resulting arrangement may be narrower and/or more flexible in at least some directions than a one-dimensional array, thereby enabling segments incorporating multi-dimensional configurations to be more easily routed through small openings and/or relatively tight-radius bends.

Figure 16A:
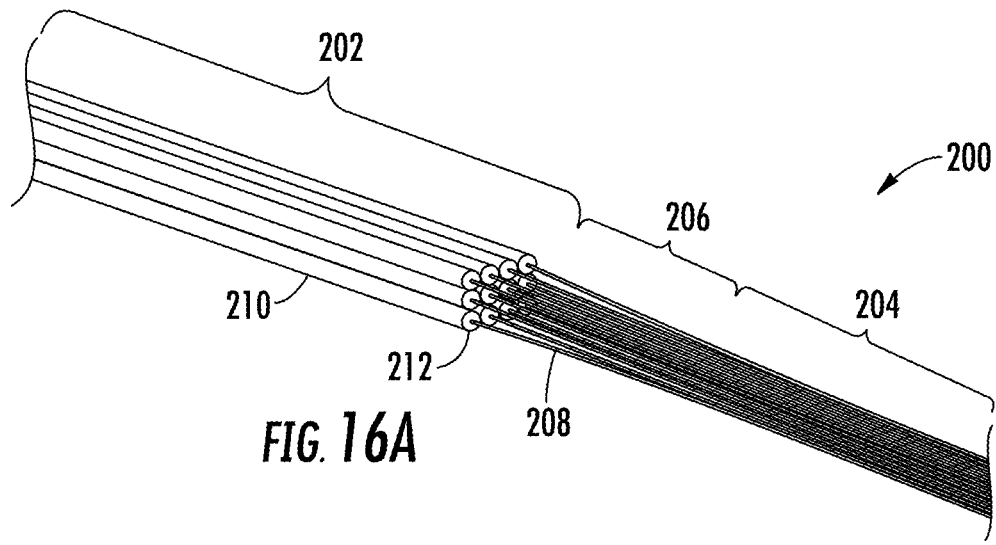
FIG. 16A is a perspective view of a fiber arrangement including a plurality of optical fibers extending through a larger pitch first segment, a smaller pitch second segment, and a transition segment all being useable for forming an optical fiber fan-out assembly according to one embodiment, with the plurality of optical fibers arranged in a multi-dimensional (3×4) array in the first segment, and arranged in a one-dimensional (1×12) array in the second segment.
Figure 16B:
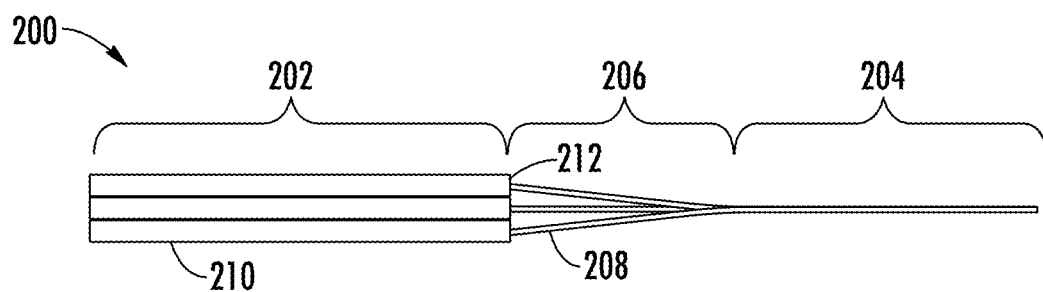
FIG. 16B is a side elevation view of the plurality of optical fibers of FIG. 16A.

A first example of a plurality of optical fibers transitioning from a multi-dimensional configuration to a one-dimensional array and useable for forming an optical fiber fan-out assembly is provided in FIGS. 16A and 16B. FIGS. 16A and 16B provide perspective and side elevational views, respectively, of a fiber arrangement 200 that includes a plurality of optical fibers 208 extending through a larger pitch first segment 202, a smaller pitch second segment 204, and a transition segment 206. In the first segment 202, each optical fiber 208 is encased in a buffer material 210, and the optical fibers 208 are arranged in a 3×4 array. Centers of adjacent optical fibers 208 in each row of the 3×4 array have a first pitch. Each buffer 210 terminates at a buffer end 212 corresponding to a beginning of the transition segment 206. In the second segment 204, each optical fiber 208 is devoid of a buffer, and the optical fibers 208 are arranged in a 1×12 array with centers of adjacent fibers having a second pitch that is smaller than the first pitch. In the transition segment 206, each optical fiber 208 is devoid of a buffer, and the optical fibers 208 transition from the multi-dimensional array matching the configuration of the first segment 202 to a smaller pitch one-dimensional array matching the configuration of the second segment 204.

Figure 16C:
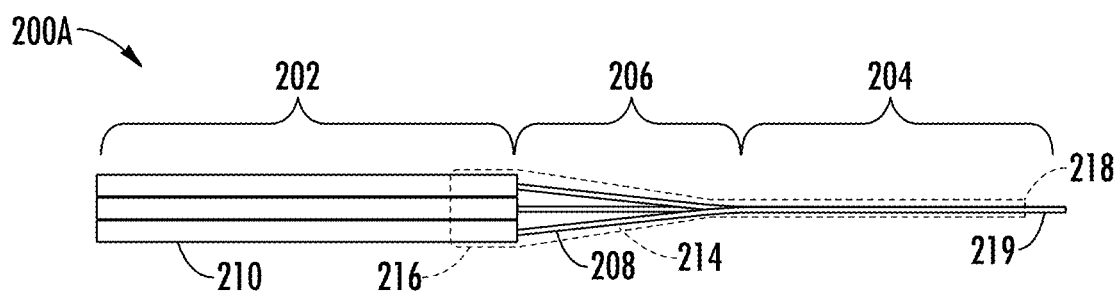
FIG. 16C is a side elevation view of the plurality of optical fibers of FIG. 16B with a continuous polymeric material encapsulating the plurality of optical fibers in the transition segment, in a portion of the first segment, and in a portion of the second segment.

As shown in FIG. 16C, at least a central portion of the fiber arrangement 200 of FIGS. 16A and 16B may be overcoated with an overcoating material 214 to form an overcoated fiber arrangement 200A. The overcoating material 214 extends over the entire transition segment 206, and over portions of each of the first segment 202 and the second segment 204. A first end 216 of the overcoating material 214 extends over buffer material 210 and terminates in the first segment 202, while a second end 218 of the overcoating material 214 extends over bare optical fibers 208 and terminates in the second segment 204. In certain embodiments, uncoated ends 219 of the optical fibers 208 extending beyond the second end 218 of the overcoating material 214 may be mass fusion spliced with an array of optical fibers of an optical ribbon (not shown) and a resulting fusion splice region may be overcoated with additional overcoating material (optionally having the same composition as the overcoating material 214).

Figure 17A:
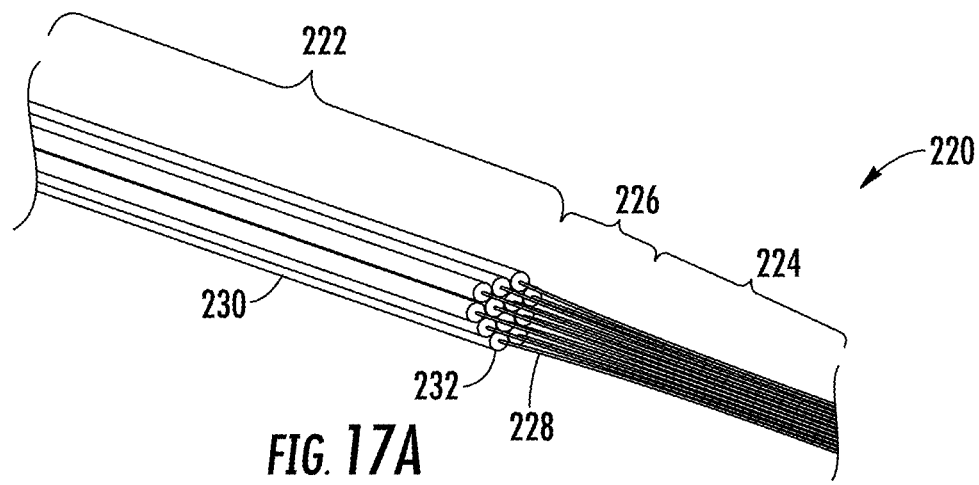
FIG. 17A is a perspective view of a plurality of optical fibers extending through a larger pitch first segment, a smaller pitch second segment, and a transition segment all being useable for forming an optical fiber fan-out assembly according to one embodiment, with the plurality of optical fibers arranged in a hexagonally packed cylindrical array in the first segment, and arranged in a one-dimensional (lx 12) array in the second segment.
Figure 17B:
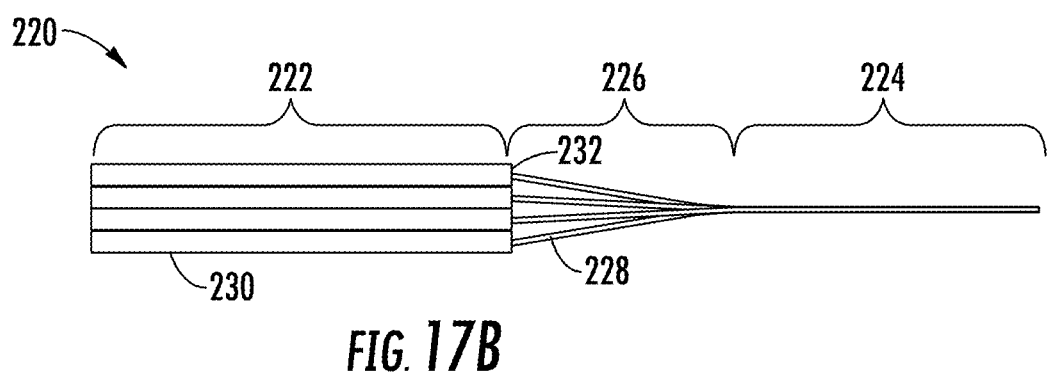
FIG. 17B is a side elevation view of the plurality of optical fibers of FIG. 17A.

A second example of a plurality of optical fibers transitioning from a multi-dimensional configuration to a one-dimensional array and useable for forming an optical fiber fan-out assembly is provided in FIGS. 17A and 17B. FIGS. 17A and 17B provide perspective and side elevational views, respectively, of a fiber arrangement 220 that includes a plurality of optical fibers 228 extending through a larger pitch first segment 222, a smaller pitch second segment 224, and a variable pitch transition segment 226. In the first segment 222, each optical fiber 228 is encased in a buffer 230, and the optical fibers 228 are arranged in a hexagonally packed cylindrical array. Each buffer 230 terminates at a buffer end 232 corresponding to a beginning of the transition segment 236. In the second segment 224, each optical fiber 228 is devoid of a buffer, and the optical fibers 228 are arranged in a 1×12 array. In the transition segment 226, each optical fiber 228 is devoid of a buffer, and the optical fibers 228 transition the configuration of the first segment 222 to the smaller pitch, one-dimensional array matching the configuration of the second segment 224.

Figure 17C:
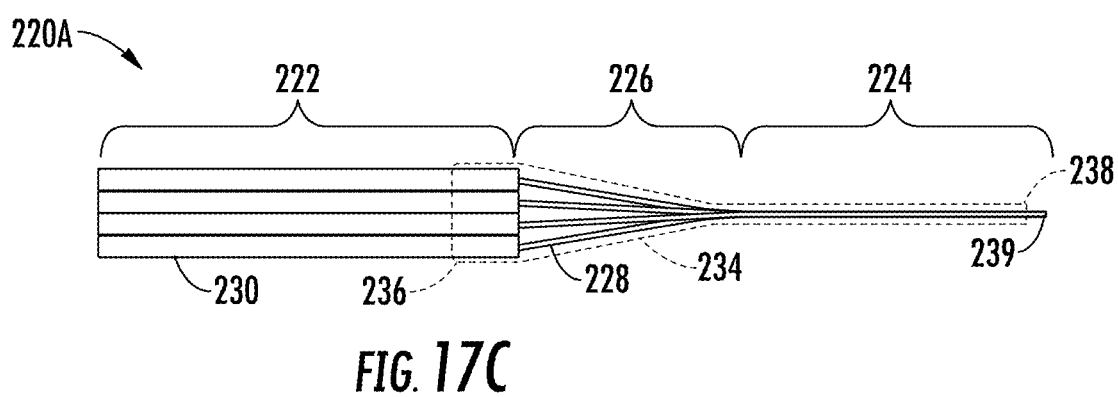
FIG. 17C is a side elevation view of the plurality of optical fibers of FIG. 17B with a continuous polymeric material encapsulating the plurality of optical fibers in the transition segment, in a portion of the first segment, and in a portion of the second segment.

As shown in FIG. 17C, at least a central portion of the fiber arrangement 220 of FIGS. 17A and 17B may be overcoated with an overcoating material 234 to form an overcoated fiber arrangement 220A. The overcoating material 224 extends over the entire transition segment 226, and over portions of each of the first segment 222 and the second segment 224. A first end 236 of the overcoating material 234 extends over buffer material 230 and terminates in the first segment 222, while a second end 238 of the overcoating material 234 extends over bare optical fibers 228 and terminates in the second segment 224. In certain embodiments, uncoated ends 239 of the optical fibers 228 extending beyond the second end 238 of the overcoating material 234 may be mass fusion spliced with an array of optical fibers of an optical ribbon (not shown) and a resulting fusion splice region may be overcoated with additional overcoating material (optionally having the same composition as the overcoating material 234).

In certain embodiments, a method for fabricating a multi-fiber assembly providing fan-out functionality comprising multiple steps is provided, and an optical fiber assembly formed by such method is further provided. One step of the method comprises arranging a first segment of a first plurality of optical fibers in a one-dimensional array having a first pitch between centers of adjacent optical fibers of the first plurality of optical fibers. A plurality of optical fiber legs extend from the one-dimensional array at an end of the first segment, each optical fiber leg of the plurality of optical fiber legs includes at least one optical fiber of the first plurality of optical fibers, and a fiber optic connector that terminates the at least one optical fiber of the optical fiber leg. Another step of the method comprises arranging a second segment of the first plurality of optical fibers in a one-dimensional array having a second pitch between centers of adjacent optical fibers of the first plurality of optical fibers, wherein the second pitch is smaller than the first pitch. The arranging of the first segment and the second segment includes defining a transition segment between the first and second segments, and in the transition segment the one-dimensional array comprises a pitch between centers of adjacent optical fibers of the plurality of optical fibers that transitions from the first pitch proximate the first segment to the second pitch proximate the second segment. Another step of the method comprises encapsulating the first plurality of optical fibers at least in the transition segment with a polymeric material (optionally by injection molding or dip coating). In at least a portion of the second segment, the first plurality of optical fibers extends beyond a boundary of the polymeric material.

In certain embodiments, the foregoing method further comprises forming a holding body encapsulating the first plurality of optical fibers in a portion of the first segment, prior to encapsulating the first plurality of optical fibers at least in the transition segment with the polymeric material. In certain embodiments, the arranging of the second segment of the first plurality of optical fibers in a one-dimensional array comprises inserting optical fibers of the first plurality of optical fibers in a fiber sorting fixture. The use of such a fixture may facilitate defining a transition segment including formation of S-bends, each including a maximum bend radius of about 22.7 mm, in at least the two outermost optical fibers of the array of optical fibers in the transition segment. In certain embodiments, prior to the arranging of the first segment, each optical fiber of the first plurality of optical fibers may be embodied in a respective connector pigtail that further includes a respective fiber optic connector terminating the optical fiber, wherein the optical fiber optionally comprises a tight buffered fiber secured to the fiber optic connector. In embodiments in which each optical fiber comprises a tight buffer, the method may further comprise stripping a portion of each tight buffer from the respective optical fiber of the first plurality of optical fibers to expose lengths of coated optical fibers that each have a diameter of 250 μm or less, prior to the arranging of the second segment of the first plurality of optical fibers in a one-dimensional array. In certain embodiments, the method further comprises stripping a coating from each optical fiber of the first plurality of optical fibers in at least a portion the second segment to form bare glass. Bare glass sections of optical fibers of the first plurality of optical fibers may be mass fusion spliced to bare glass ends of optical fibers of a second plurality of optical fibers to form a plurality of fusion splices. Thereafter, the plurality of fusion splices, the bare glass stripped sections optical fibers of the first plurality of optical fibers, and the bare glass sections of optical fibers of the second plurality of optical fibers, may be encapsulated with a polymeric material. In certain embodiments, the second plurality of optical fibers may comprise an optical fiber ribbon having an end terminated with a multi-fiber connector.

Example

Tight buffered sections of twelve SC-type connector pigtails are bundled together with a bundling body using the method described previously herein, with unbuffered optical fibers extending beyond the bundling body. TECHNOMELT® PA 6208 polyamide material is used to form the bundling body. One set of six connectors has a pigtail length of 75 mm, and another set of six connectors has a pigtail length of 50 mm. The buffer material is PVC, which has a lower melting temperature than the polyamide bundling body material, but a dip coating process for applying the bundling body is completed in a short time and the buffers remain intact after formation of the bundling body. Steps in forming the holding body and the transition segment, then encapsulating the transition segment and the second segment, are performed as described above in connection with FIGS. 8-11. The same polyamide material is used to form the bundling body is also used to form the holding body and to encapsulate the transition and second segments. At an end of the second segment, an initially ribbonized fiber is stripped of polymeric material (e.g., polymeric encapsulant and polymer coating), cleaned, and cleaved using standard ribbon fiber termination tools. The completed optical fiber fan-out assembly is consistent with the assembly illustrated in FIG. 13, except for the presence of two groups of six optical fiber legs of different lengths.

The above-described optical fiber fan-out assembly is mass fusion spliced to a MPO connector pigtail, with previously stripped (bare) portions and the splice region encapsulated using the same polyamide material used for formation of the bundling body, holding body, and multi-segment encapsulation. The resulting cable assembly is consistent with the assembly illustrated in FIG. 15, except for the presence of two groups of six optical fiber legs of different lengths. The entire cable assembly is flexible. Both the transition segment and the splice region (which are devoid of any housings or strength members) can be bent at a radius down to 25 mm without incurring measurable macro bend loss.

Those skilled in the art will appreciate that modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. An optical fiber fan-out assembly comprising:
   a plurality of optical fibers arranged in a one-dimensional array extending through a first segment, a second segment, and a transition segment disposed between the first and second segments;
   a plurality of optical fiber legs extending from the one-dimensional array at an end of the first segment, wherein each optical fiber leg of the plurality of optical fiber legs includes at least one optical fiber of the plurality of optical fibers and a fiber optic connector that terminates the at least one optical fiber of the optical fiber leg; and
   a polymeric material encapsulating the plurality of optical fibers in the transition segment;
   a holding body encapsulating the plurality of optical fibers in a portion of the second segment, wherein at least a portion of the holding body is encapsulated by the polymeric material;
   wherein:
   in the first segment, the one-dimensional array comprises a first pitch between centers of adjacent optical fibers of the plurality of optical fibers;
   in the second segment, the one-dimensional array comprises a second pitch between centers of adjacent optical fibers of the plurality of optical fibers;
   in the transition segment, the one-dimensional array transitions from the first pitch proximate the first segment to the second pitch proximate the second segment; and
   in at least a portion of the second segment distal from the transition segment, the plurality of optical fibers extends beyond a boundary of the polymeric material.

2. The optical fiber fan-out assembly of claim 1, wherein in the at least a portion of the second segment, the plurality of optical fibers comprises bare glass optical fibers extending beyond the boundary of the polymeric material.

3. The optical fiber fan-out assembly of claim 1, wherein the plurality of optical fiber legs comprises tight buffered optical fibers, loose tube buffered optical fibers, or jacketed optical fibers.

4. The optical fiber fan-out assembly of claim 1, wherein the fiber optic connector of each optical fiber leg comprises a simplex connector or a duplex connector.

5. The optical fiber fan-out assembly of claim 1, wherein:
   the one-dimensional array has a lengthwise axis, a widthwise axis orthogonal to the lengthwise axis, and a thickness axis orthogonal to the lengthwise and widthwise axes; and
   the polymeric material encapsulating the plurality of optical fibers in the transition segment has a narrow width profile, having a width along the widthwise axis that is no greater than 2 mm wider at any position than a widthwise extent of the plurality of optical fibers in the transition segment at that position.

6. The optical fiber fan-out assembly of claim 1, wherein:
   the one-dimensional array has a lengthwise axis, a widthwise axis orthogonal to the lengthwise axis, and a thickness axis orthogonal to the lengthwise and widthwise axes; and
   the polymeric material encapsulating the plurality of optical fibers in the transition segment has a thickness along the thickness axis that is no greater than 2 mm thicker than a thickness of the plurality of optical fibers in the transition segment.

7. The optical fiber fan-out assembly of claim 1, wherein:
the one-dimensional array has a lengthwise axis, a widthwise axis orthogonal to the lengthwise axis, and a thickness axis orthogonal to the lengthwise and widthwise axes; and
in the transition segment:
a first widthwise dimension corresponding to a maximum widthwise extent of the one-dimensional array varies with position along a lengthwise dimension of the transition segment;
a second widthwise dimension corresponding to a maximum widthwise extent of the polymeric material varies with position along the lengthwise dimension of the transition segment;
the second widthwise dimension exceeds the first widthwise dimension at each position by a width differential, and the width differential varies with position along the lengthwise dimension of the transition segment by no more than about 20%.

8. The optical fiber fan-out assembly of claim 1, wherein:
the one-dimensional array has a lengthwise axis, a widthwise axis orthogonal to the lengthwise axis, and a thickness axis orthogonal to the lengthwise and widthwise axes;
the second segment comprises an optical fiber ribbon containing the plurality of optical fibers; and
in the transition segment, the polymeric material encapsulating the plurality of optical fibers provides a flexible support for the plurality of optical fibers, with the transition segment being at least 50% as flexible as the optical fiber ribbon in bending about the thickness axis.

9. The optical fiber fan-out assembly of claim 1, wherein:
the plurality of optical fibers includes two outermost optical fibers of the one-dimensional array, and in the transition segment, the two outermost optical fibers each form an S-bend having a minimum bend radius of at least 22.7 mm.

10. The optical fiber fan-out assembly of claim 1, wherein the holding body comprises a material having the same composition as the polymeric material.

11. The optical fiber fan-out assembly of claim 1, wherein each optical fiber of the plurality of optical fibers in the first segment comprises a tight buffered optical fiber.

12. The optical fiber fan-out assembly of claim 11, further comprising a bundling body encapsulating a plurality of the tight buffered fibers in a portion of the first segment.

13. The optical fiber fan-out assembly of claim 1, being devoid of a housing and devoid of a strength member arranged in, on, or around the polymeric material encapsulating the plurality of optical fibers in the transition segment.

14. The optical fiber fan-out assembly of claim 1, wherein the first pitch is 900 µm, and the second pitch is 250 µm or less.

15. The optical fiber fan-out assembly of claim 1, wherein the polymeric material comprises a melt-flow thermoplastic adhesive.

16. The optical fiber fan-out assembly of claim 1, wherein the plurality of optical fibers comprises at least four optical fibers.

17. The optical fiber fan-out assembly of claim 1, wherein each optical fiber leg is devoid of a furcation tube.

18. A fiber optic cable assembly comprising:
a first plurality of optical fibers arranged in a one-dimensional array extending through a first segment, a second segment, and a transition segment disposed between the first and second segments, wherein each optical fiber of the first plurality of optical fibers includes a first bare glass section along an end of the second segment distal from the transition segment;
a plurality of optical fiber legs extending from the one-dimensional array at an end of the first segment, wherein each optical fiber leg of the plurality of optical fiber legs includes at least one optical fiber of the first plurality of optical fibers and a fiber optic connector that terminates at least one optical fiber of the optical fiber leg;
a first polymeric material encapsulating the first plurality of optical fibers in the transition segment;
wherein:
in the first segment, the one-dimensional array comprises a first pitch between centers of adjacent optical fibers of the first plurality of optical fibers;
in the second segment, the one-dimensional array comprises a second pitch between centers of adjacent optical fibers of the first plurality of optical fibers; and
in the transition segment, the one-dimensional array transitions from the first pitch proximate the first segment to the second pitch proximate the second segment;
a second plurality of optical fibers arranged in a one-dimensional array, wherein each optical fiber of the second plurality of optical fibers includes a second bare glass section;
a plurality of fusion splices connecting ends of the first bare glass sections to ends of the second bare glass sections; and
a second polymeric material encapsulating the plurality of fusion splices, the first bare glass sections, and the second bare glass sections.

19. The fiber optic cable assembly of claim 18, further comprising a multi-fiber connector terminating an end of the second plurality of optical fibers that is opposite the ends of the second bare glass sections.

20. The fiber optic cable assembly of claim 18, wherein the first polymeric material comprises a material having the same composition as the second polymeric material.

21. The fiber optic cable assembly of claim 18, wherein each optical fiber of the first plurality of optical fibers in the first segment comprises a tight buffered fiber, and the fiber optic cable assembly further comprises a bundling body encapsulating the tight buffered fibers in a portion of the first segment.

22. The fiber optic cable assembly of claim 18, being devoid of any housing or strength member arranged in, on, or around one or more of: (i) the first polymeric material encapsulating the first plurality of optical fibers in the transition segment, or (ii) the second polymeric material encapsulating the plurality of fusion splices, the first bare glass sections, and the second bare glass sections.

23. The fiber optic cable assembly of claim 18, each optical fiber of the first plurality of optical fibers in the first segment comprises a tight buffered optical fiber.

24. The fiber optic cable assembly of claim 18, wherein each optical fiber leg is devoid of a furcation tube.

25. An optical fiber fan-out assembly comprising:
a plurality of optical fibers arranged in a one-dimensional array extending through a first segment, a second segment, and a transition segment disposed between the first and second segments;

a plurality of optical fiber legs extending from the one-dimensional array at an end of the first segment, wherein each optical fiber leg of the plurality of optical fiber legs includes at least one optical fiber of the plurality of optical fibers and a fiber optic connector that terminates the at least one optical fiber of the optical fiber leg; and a polymeric material encapsulating the plurality of optical fibers in the transition segment;

wherein:

the one-dimensional array has a lengthwise axis, a widthwise axis orthogonal to the lengthwise axis, and a thickness axis orthogonal to the lengthwise and widthwise axes; and the polymeric material encapsulating the plurality of optical fibers in the transition segment has a narrow width profile, having a width along the widthwise axis that is no greater than 2 mm wider at any position than a widthwise extent of the plurality of optical fibers in the transition segment at that position; and wherein:

in the first segment, the one-dimensional array comprises a first pitch between centers of adjacent optical fibers of the plurality of optical fibers;

in the second segment, the one-dimensional array comprises a second pitch between centers of adjacent optical fibers of the plurality of optical fibers;

in the transition segment, the one-dimensional array transitions from the first pitch proximate the first segment to the second pitch proximate the second segment; and in at least a portion of the second segment distal from the transition segment, the plurality of optical fibers extends beyond a boundary of the polymeric material.

* * * * *

UNITED STATES PATENT AND TRADEMARK OFFICE
CERTIFICATE OF CORRECTION

PATENT NO. : 10,921,540 B2
APPLICATION NO. : 16/555157
DATED : February 16, 2021
INVENTOR(S) : Qi Wu Page 1 of 1

It is certified that error appears in the above-identified patent and that said Letters Patent is hereby corrected as shown below:

On the Title Page

In Column 1, item (73), Assignee, Line 1, delete "coming," and insert -- Corning, --, therefor.

On page 2, in Column 2, item (56), Other Publications, Line 29, delete "Usion" and insert -- Fusion --, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*